US012641199B2

(12) United States Patent
Hosdurg et al.

(10) Patent No.: US 12,641,199 B2
(45) Date of Patent: May 26, 2026

(54) FACILITATING CONTEXT-AWARE SECURITY FOR CONNECTED VEHICLES

(71) Applicant: Cisco Technology, Inc., San Jose, CA (US)

(72) Inventors: Santhosh Kumar Hosdurg, Dunwoody, GA (US); Grant L. Regan, Marietta, GA (US); Yeshavanta Palakshappa Kubusada, Lathrop, CA (US); Azita Kia, Santa Barbara, CA (US); Ravi Kiran Guntupalli, Cumming, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 22 days.

(21) Appl. No.: 18/953,330

(22) Filed: Nov. 20, 2024

(65) Prior Publication Data

US 2026/0143088 A1 May 21, 2026

(51) Int. Cl.
| | |
|---|---|
| *H04N 7/18* | (2006.01) |
| *B60R 25/20* | (2013.01) |
| *B60R 25/30* | (2013.01) |

(52) U.S. Cl.
CPC ............. *H04N 7/181* (2013.01); *B60R 25/20* (2013.01); *B60R 25/305* (2013.01)

(58) Field of Classification Search
CPC ........ H04N 7/181; B60R 25/20; B60R 25/305
See application file for complete search history.

(56) References Cited

U.S. PATENT DOCUMENTS

| | | | | |
|---|---|---|---|---|
| 10,204,496 B2 * | 2/2019 | Miller, II | ......... | G08B 13/19602 |
| 2024/0201688 A1 | 6/2024 | Ko | | |

FOREIGN PATENT DOCUMENTS

| | | | |
|---|---|---|---|
| CN | 115038086 A | | 9/2022 |
| CN | 117774948 | * | 3/2024 |
| CN | 117774948 A | | 3/2024 |
| CN | 118419047 | * | 8/2024 |
| CN | 118419047 A | | 8/2024 |

OTHER PUBLICATIONS

Verkada: "Total Control at Your Fingertips With PTZ Technology", CP52-E PTZ Camera, Retrieved from www.verkada.com on Sep. 10, 2024, pp. 1-15.

* cited by examiner

*Primary Examiner* — Kathleen V Nguyen
(74) *Attorney, Agent, or Firm* — Edell, Shapiro & Finnan, LLC

(57) ABSTRACT

Provided herein are techniques to facilitate context-aware security for connected vehicles. In at least one embodiment, a method is provided that may include obtaining, by a vehicle server, a location indication including a parked location of a vehicle; identifying, by the vehicle server, at least one external security camera at the parked location of the vehicle that is available to monitor the vehicle; providing, by the vehicle server, a camera indication to the vehicle that identifies an availability of the at least one external security camera that is capable of monitoring the vehicle at the parked location; and obtaining, by the vehicle server, a security mode indication from the vehicle indicating an onboard security monitoring mode for the vehicle based, at least in part, on the camera indication.

20 Claims, 9 Drawing Sheets

IMAGE FROM CAMERA 104(2) [LOOKING N-NE, PROVIDES VIEWS OF SOUTH SIDE OF VEHICLE] 107(2)

IMAGE FROM CAMERA 104(1) [LOOKING IN DIRECTION TO S-SE, PROVIDES VIEWS OF NORTH SIDE OF VEHICLE] 107(1)

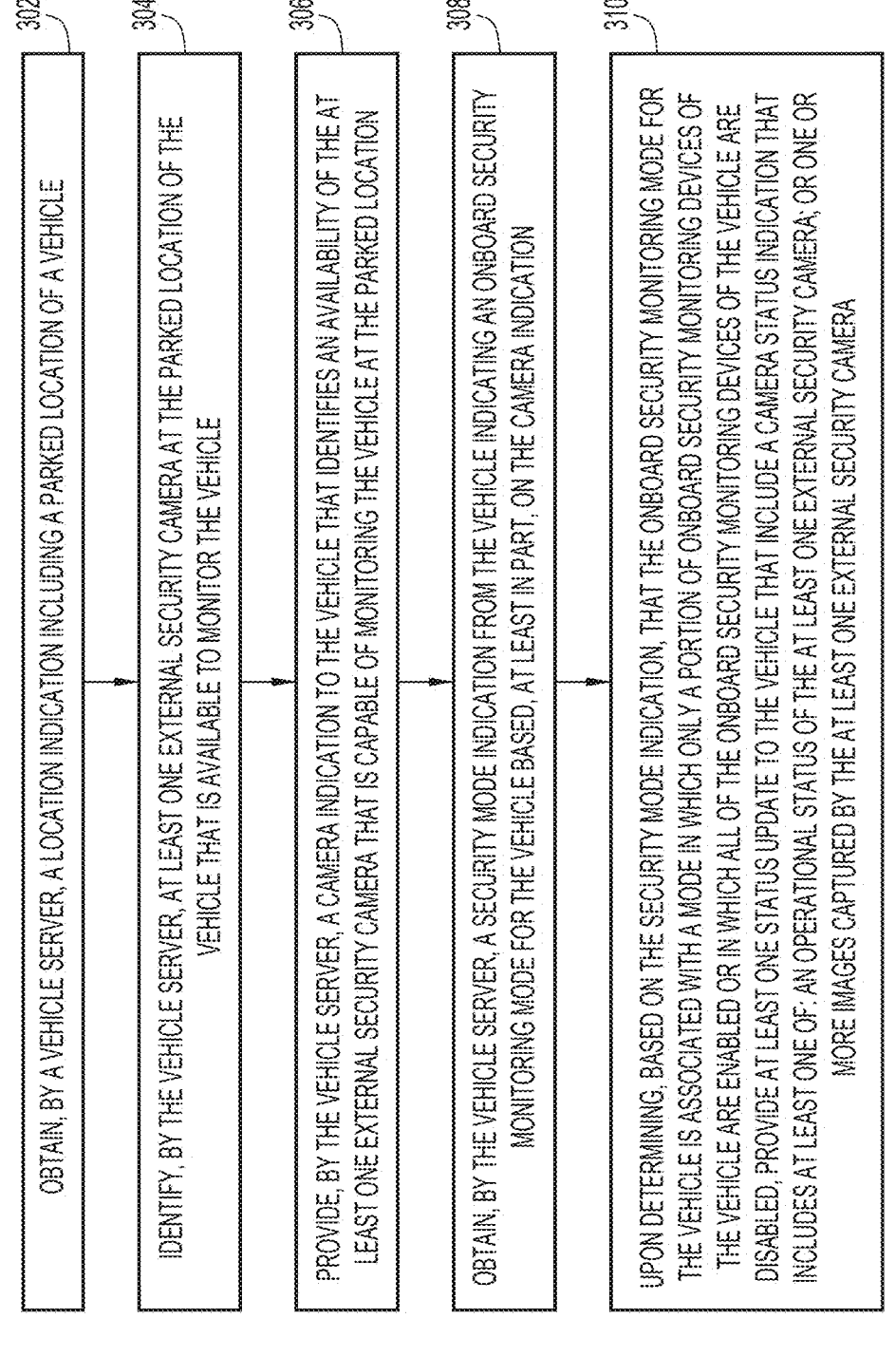

302 OBTAIN, BY A VEHICLE SERVER, A LOCATION INDICATION INCLUDING A PARKED LOCATION OF A VEHICLE

304 IDENTIFY, BY THE VEHICLE SERVER, AT LEAST ONE EXTERNAL SECURITY CAMERA AT THE PARKED LOCATION OF THE VEHICLE THAT IS AVAILABLE TO MONITOR THE VEHICLE

306 PROVIDE, BY THE VEHICLE SERVER, A CAMERA INDICATION TO THE VEHICLE THAT IDENTIFIES AN AVAILABILITY OF THE AT LEAST ONE EXTERNAL SECURITY CAMERA THAT IS CAPABLE OF MONITORING THE VEHICLE AT THE PARKED LOCATION

308 OBTAIN, BY THE VEHICLE SERVER, A SECURITY MODE INDICATION FROM THE VEHICLE INDICATING AN ONBOARD SECURITY MONITORING MODE FOR THE VEHICLE BASED, AT LEAST IN PART, ON THE CAMERA INDICATION

310 UPON DETERMINING, BASED ON THE SECURITY MODE INDICATION, THAT THE ONBOARD SECURITY MONITORING MODE FOR THE VEHICLE IS ASSOCIATED WITH A MODE IN WHICH ONLY A PORTION OF ONBOARD SECURITY MONITORING DEVICES OF THE VEHICLE ARE ENABLED OR IN WHICH ALL OF THE ONBOARD SECURITY MONITORING DEVICES OF THE VEHICLE ARE DISABLED, PROVIDE AT LEAST ONE STATUS UPDATE TO THE VEHICLE THAT INCLUDE A CAMERA STATUS INDICATION THAT INCLUDES AT LEAST ONE OF: AN OPERATIONAL STATUS OF THE AT LEAST ONE EXTERNAL SECURITY CAMERA; OR ONE OR MORE IMAGES CAPTURED BY THE AT LEAST ONE EXTERNAL SECURITY CAMERA

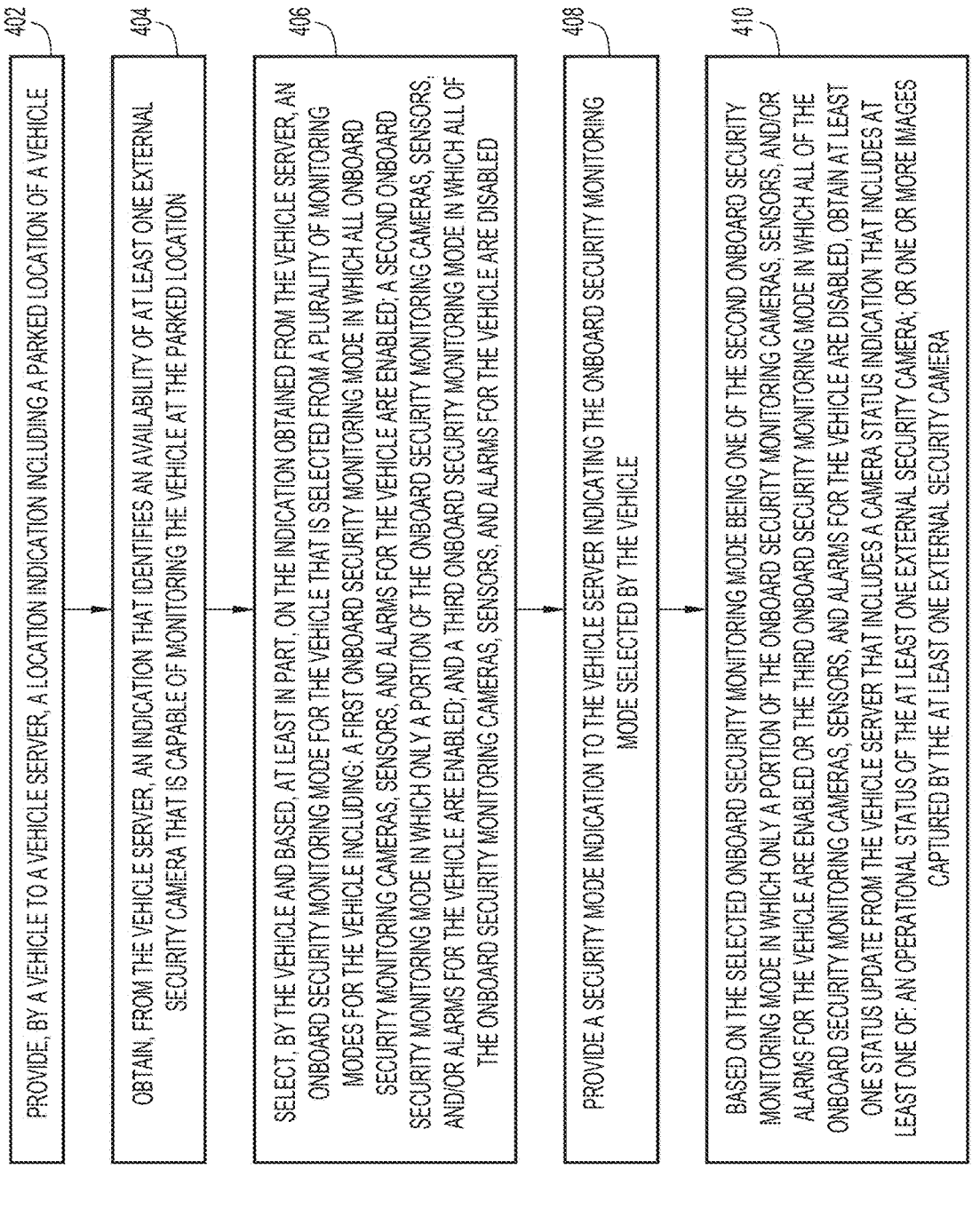

402 PROVIDE, BY A VEHICLE TO A VEHICLE SERVER, A LOCATION INDICATION INCLUDING A PARKED LOCATION OF A VEHICLE

404 OBTAIN, FROM THE VEHICLE SERVER, AN INDICATION THAT IDENTIFIES AN AVAILABILITY OF AT LEAST ONE EXTERNAL SECURITY CAMERA THAT IS CAPABLE OF MONITORING THE VEHICLE AT THE PARKED LOCATION

406 SELECT, BY THE VEHICLE AND BASED, AT LEAST IN PART, ON THE INDICATION OBTAINED FROM THE VEHICLE SERVER, AN ONBOARD SECURITY MONITORING MODE FOR THE VEHICLE THAT IS SELECTED FROM A PLURALITY OF MONITORING MODES FOR THE VEHICLE INCLUDING: A FIRST ONBOARD SECURITY MONITORING MODE IN WHICH ALL ONBOARD SECURITY MONITORING CAMERAS, SENSORS, AND ALARMS FOR THE VEHICLE ARE ENABLED; A SECOND ONBOARD SECURITY MONITORING MODE IN WHICH ONLY A PORTION OF THE ONBOARD SECURITY MONITORING CAMERAS, SENSORS, AND/OR ALARMS FOR THE VEHICLE ARE ENABLED; AND A THIRD ONBOARD SECURITY MONITORING MODE IN WHICH ALL OF THE ONBOARD SECURITY MONITORING CAMERAS, SENSORS, AND ALARMS FOR THE VEHICLE ARE DISABLED

408 PROVIDE A SECURITY MODE INDICATION TO THE VEHICLE SERVER INDICATING THE ONBOARD SECURITY MONITORING MODE SELECTED BY THE VEHICLE

410 BASED ON THE SELECTED ONBOARD SECURITY MONITORING MODE BEING ONE OF THE SECOND ONBOARD SECURITY MONITORING MODE IN WHICH ONLY A PORTION OF THE ONBOARD SECURITY MONITORING CAMERAS, SENSORS, AND/OR ALARMS FOR THE VEHICLE ARE ENABLED OR THE THIRD ONBOARD SECURITY MONITORING MODE IN WHICH ALL OF THE ONBOARD SECURITY MONITORING CAMERAS, SENSORS, AND ALARMS FOR THE VEHICLE ARE DISABLED, OBTAIN AT LEAST ONE STATUS UPDATE FROM THE VEHICLE SERVER THAT INCLUDES A CAMERA STATUS INDICATION THAT INCLUDES AT LEAST ONE OF: AN OPERATIONAL STATUS OF THE AT LEAST ONE EXTERNAL SECURITY CAMERA; OR ONE OR MORE IMAGES CAPTURED BY THE AT LEAST ONE EXTERNAL SECURITY CAMERA

FACILITATING CONTEXT-AWARE SECURITY FOR CONNECTED VEHICLES

TECHNICAL FIELD

The present disclosure relates to network equipment and services involving connected vehicles.

BACKGROUND

Some connected vehicles offer onboard security services through which onboard cameras, sensors, etc. are utilized to monitor the internal and external environment for a vehicle. A connected vehicle configured to provides such security services can analyze, via a security system image data from the cameras and sensor data from the sensors in order to detect the potential occurrence of security threats, such as someone attempting to break into or otherwise harm/tamper with the vehicle. While such security services can be useful to protect the integrity of a vehicle, these security services can impose a significant power drain on the power system (e.g., batteries) that power the vehicle. As such, there are significant challenges with providing security services for connected vehicles.

BRIEF DESCRIPTION OF THE DRAWINGS

FIG. 3 is a flow chart depicting a method according to an example embodiment.

FIG. 4 is a flow chart depicting another method according to an example embodiment.

DETAILED DESCRIPTION

Overview

Figure 1A:
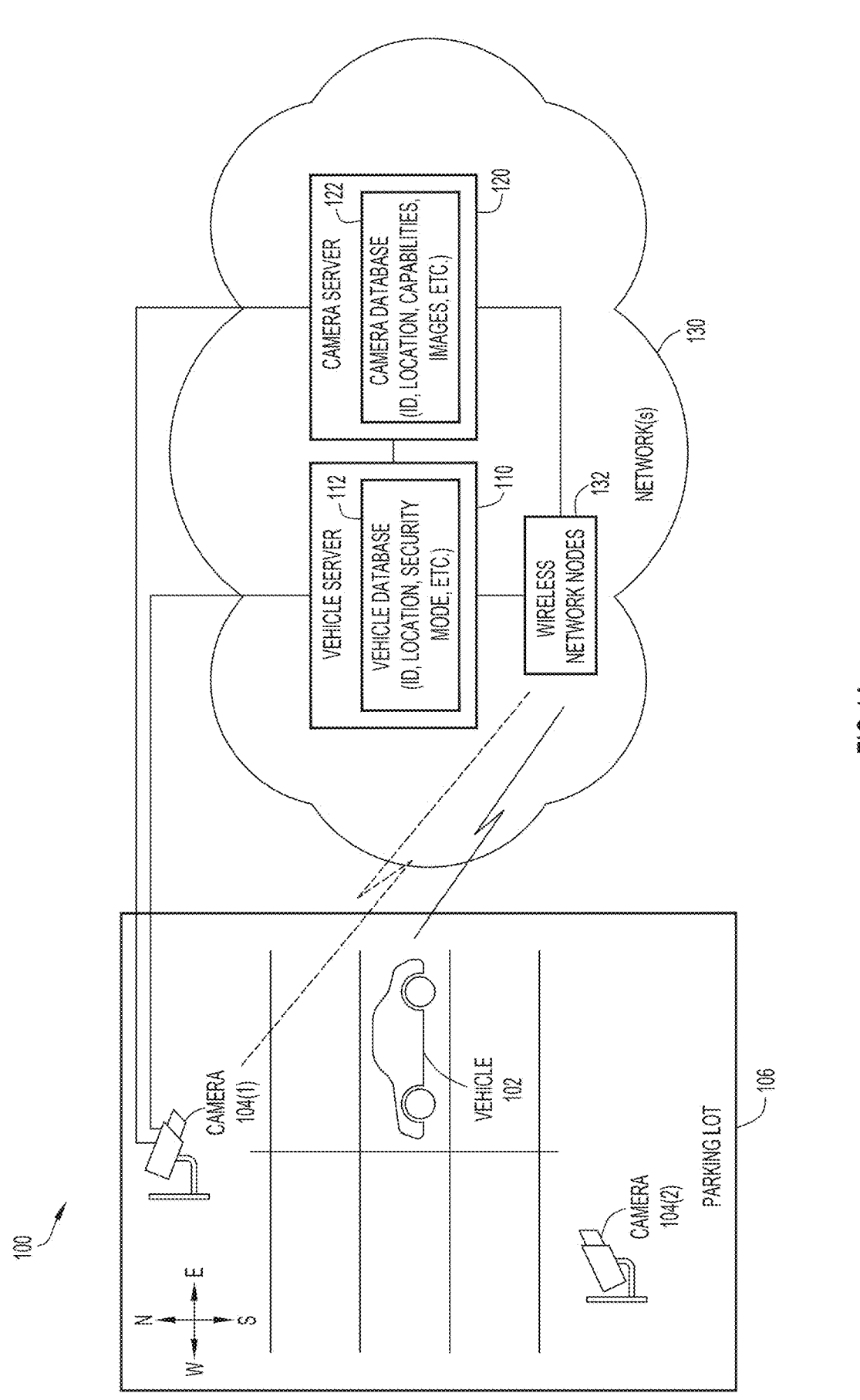
FIG. 1A is a block diagram of a system that may be implemented to facilitate context-aware security for one or more connected vehicles, according to an example embodiment.

Embodiments presented herein provide for the ability of a vehicle to leverage one or more external security cameras available at parked location of the vehicle to provide external security/surveillance for the vehicle while at the parked location. A vehicle server can communicate with the vehicle regarding the availability and/or capability of one or more external security cameras at the parked location of the vehicle. The vehicle can select an onboard security monitoring mode based on the communications with the vehicle server. The vehicle server can provide status and/or image update(s) to the vehicle upon determining that the vehicle has selected to leverage security/surveillance of one or more external security cameras at the parked location of the vehicle.

In at least one embodiment, a method is provided that may include obtaining, by a vehicle server, a location indication including a parked location of a vehicle; identifying, by the vehicle server, at least one external security camera at the parked location of the vehicle that is available to monitor the vehicle; providing, by the vehicle server, a camera indication to the vehicle that identifies an availability of the at least one external security camera that is capable of monitoring the vehicle at the parked location; and obtaining, by the vehicle server, a security mode indication from the vehicle indicating an onboard security monitoring mode for the vehicle based, at least in part, on the camera indication. In at least one embodiment, upon determining, based on the security mode indication, that the onboard security monitoring mode for the vehicle is associated with a mode in which only a portion of onboard security monitoring devices of the vehicle are enabled or in which all of the onboard security monitoring devices of the vehicle are disabled, the method may include providing at least one status update to the vehicle that includes a camera status indication that includes at least one of: an operational status of the at least one external security camera; or one or more images captured by the at least one external security camera.

Example Embodiments

Connected vehicles often offer advanced features, such as onboard security monitoring mode features (e.g., Sentry Mode for Tesla® vehicles), which can be activated for a vehicle to monitor the surroundings and activates alarms for potential threats (e.g., break-in attempts, tampering, etc.). While an onboard security monitoring mode can be activated for a vehicle to enhance security for the vehicle, activating the mode comes with the trade-off of increased battery drain that, for electric vehicles (EVs), can reduce the overall range (number of miles that an EV can be driven) before a charging event is needed. Tesla® is a registered trademark of Tesla, Inc.

For example, an average 1-2% battery drain per hour may be experienced for vehicles in which an onboard security monitoring mode is activated. For scenarios in which a vehicle is parked for a long period of time, such as at an airport over 2-3 days (e.g., the average business trip duration) without charging, can result in reduced range or potentially even making the vehicle undrivable once the driver returns to the vehicle.

Further, increased battery drain from an activated onboard security monitoring mode can translate to more frequent charging cycles, which can significantly accelerate battery degradation in EVs and can lead to bad consumer experience. This degradation can manifest as reduced range and/or shortened battery life, leading to replacement of the batteries, which can be expensive. Thus, one of the biggest challenges for EVs is battery longevity. Since the EVs rely solely on electricity for everything, conservation of battery/battery life as much as possible is highly desirable.

Thus, while a single onboard security monitoring mode activation might have minimal impact on a vehicle's battery, frequent use of the onboard security monitoring mode can contribute to accelerated battery degradation in some cases.

Balancing security features with efficient battery utilization would be useful to minimize power consumption while maintaining security functionalities. Such efforts to balance security features should not compromise user safety and security by limiting security functionalities or accessibility.

Broadly, embodiments herein provide technique to facilitate context-aware security for connected vehicles through various context-awareness operations/interactions that can be used inform a connected vehicle regarding the availability and/or capabilities of one or more external security cameras that may provide surveillance/security for a location at which the vehicle is parked. From the awareness regarding the availability and/or capabilities of one or more external cameras, the vehicle can determine an onboard security monitoring mode to provide for the vehicle while parked at the location.

Referring to FIG. 1A, FIG. 1A is a block diagram of a system 100 that may be provided to facilitate context-aware security for connected vehicles, according to an example embodiment. In at least one embodiment, system 100 may include a connected vehicle, referred to herein as a vehicle 102, at least one camera 104(1) provided for a parking lot 106, a vehicle server 110, a camera server 120, and at least one more wireless network node 132.

It is to be understood that any number of cameras can be present in system 100 and can be connected to vehicle server 110 and camera server 120. Cameras 104(1) and 104(2) can be referred to herein interchangeably as an external security camera, an external surveillance camera, a 'smart' camera, and/or any variations thereof that is considered external to or not 'onboard' vehicle 102, such as at least one onboard camera that can be configured for vehicle 102.

Vehicle server 110 can be configured with a vehicle database 112 that can be configured to store/maintain various data/information/etc. related to one or more vehicles that may be present in system 100, such as vehicle 102, as discussed for embodiments herein. Camera server 120 can be configured with a camera database 122 that can be configured to store/maintain various data/information related to one or more cameras that may be present for one or more locations of system 100 (e.g., at parking lot 106). Cardinal directions (North (N), South(S), East (E), and West (W)) are shown for the parking lot 106, which may be used in examples discussed herein, potentially with reference to intercardinal directions as well.

It is to be understood that vehicle server 110 and camera server 120 can interface with multiple parking lots or locations at which one or more vehicles can be parked.

In at least one embodiment, the camera 104(1), camera 104(2), camera server 120, vehicle server 110, and wireless network node 132 can interface via any combination of wired and/or wireless connections via at least one network 130. In at least one embodiment, vehicle 102 may interface with wireless network node 132 via any combination of wireless/over-the-air (OTA) wireless wide area network connections (e.g., one or more Third Generation Partnership Project (3GPP)/cellular access network connections) and/or wireless local area network connections (e.g., one or more Institute of Electrical and Electronics Engineers (IEEE) 802.11/Wi-Fi access network connections) that may be provided by wireless network node 132. The vehicle 102, via wireless network node 132, can interface with vehicle server 110 and/or camera server 120 in any manner.

In various embodiments, communications for system 100 among any of vehicle 102, vehicle server 110, camera server 120, camera 104(1), and camera 104(2) can be facilitated via any combination of application programming interface (API) communications/functionality that can be configured for the elements of system 100.

The vehicle server 110 may be any application(s)/computing device(s) and/or application operable to manage one or more services provided for one or more connected vehicles within system 100, such as managing/providing security services to vehicle 102 via camera server 120 and cameras 104(1) and 104(2). The vehicle server 110, via vehicle database 112, can manage/store identifying (ID) information for one or more vehicles that may be managed thereby (e.g., Vehicle Identification Number (VIN), owner/ driver information, Internet Protocol (IP) address information and/or Media Access Control (MAC) address information associated with network connected elements of vehicles, an application identifier for a security application/ logic configured for the vehicle 102, etc.), location information for vehicles (e.g., parked location, such as latitude/ longitude, GPS location, network reported location, and/or other coordinate/location information that indicates a geographic location of vehicle 102), onboard security monitoring mode state/level information for the onboard security monitoring mode selected by vehicles, combinations thereof, and/or any other information/data as may be discussed for embodiments herein. In some embodiments, the vehicle server 110 may maintain a history of the (typical) hours that vehicle 102 may be parked at/near one or more locations.

In some instances, context-awareness regarding the availability of external cameras for surveillance/security as provided through embodiments herein can be offered to users/ drivers of vehicles on a subscription basis, on an event basis (e.g., for concerts, when entering an airport, etc.), and/or any combination thereof. Thus, the user/driver of vehicle 102 can register the vehicle 102 for external security serves (using an app, etc.) via vehicle server 110 such that details for the vehicle 102 and potentially for the user/driver can be stored via vehicle database 112. Any combination of subscriptions, subscription options, etc. can be envisioned for different context-aware security operations that can be provided to a vehicle 102 in accordance with embodiments herein.

The camera server 120 may be any application(s)/computing device(s) operable to manage cameras 104(1) and 104(2), including managing/storing the operating state of the cameras, identifying (ID) information of the cameras (e.g., serial number, Internet Protocol (IP) address, Media Access Control (MAC) address, etc.), capability information of the cameras (e.g., resolution, color/non-color capabilities, night vision capabilities, tilt capabilities, pan capabilities, zoom capabilities, etc.), location information of the cameras, visual/viewable coverage area of the cameras (e.g., latitude/ longitude (Lat-Lon), network reported location, and/or other coordinate/location information that can define the (potential) visual coverage area or 'view' of cameras, which can vary for cameras that are capable of tilt/pan/zoom operations), images/image data for images and/or streaming video captured by the cameras (e.g., to provide camera image feeds/clips to a vehicle depending on its selected onboard security monitoring mode), combinations thereof, and/or any other information/data as may be discussed for embodiments herein.

Although illustrated as separate elements, in some implementations, camera server 120 may be implemented within/ as part of vehicle server 110. For example, in some implementations, camera server 120 may be implemented as camera server functionality configured for vehicle server 110.

Figure 1B:
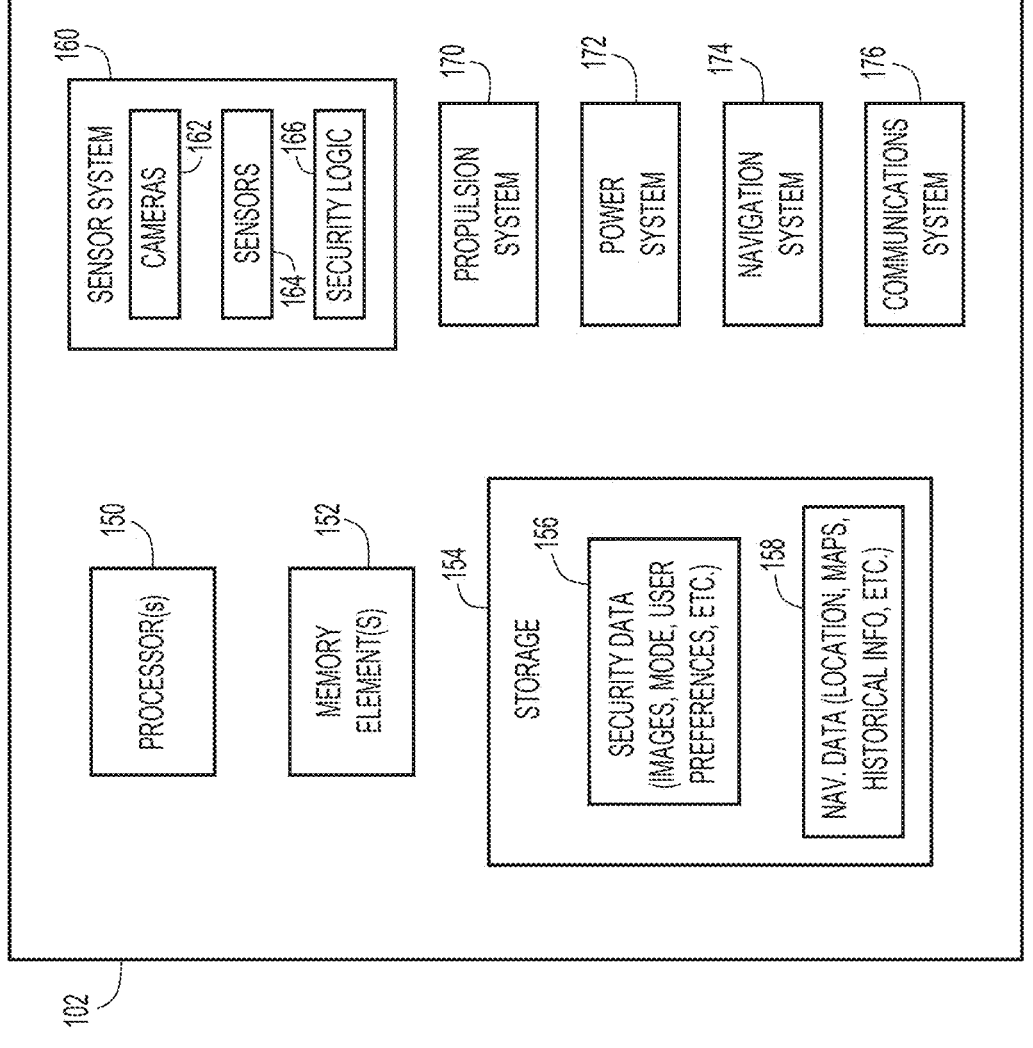
FIG. 1B is a block diagram illustrating example details for a connected vehicle, according to an example embodiment.

Before discussing various operations that may be facilitated via system 100, consider various example details for vehicle 102, discussed with reference to FIG. 1B, which is a block diagram illustrating example details of vehicle 102, according to an example embodiment.

In at least one embodiment, vehicle 102 may include one or more processors 150, one or more memory elements 152, storage 154, a sensor system 160, a propulsion system 170, a power system 172, a navigation system 174, and a communications system 176.

Processor(s) 150 is/are at least one hardware processor configured to execute various tasks, operations and/or functions for vehicle 102 according to software and/or instructions configured for vehicle 102. Processor(s) 150 (e.g., a hardware processor) can execute any type of instructions associated with data to achieve the operations detailed herein. In at least one embodiment, memory element(s) 152 and/or storage 154 is/are configured to store data, information, software, and/or instructions associated with vehicle, and/or logic configured for memory element(s) 504, storage 506, and/or any systems configured for the vehicle (e.g., sensor system 160, propulsion system 170, power system 172, navigation system 174, and/or communications system 176). Note that in some embodiments, storage 154 can be consolidated with memory element(s) 152 (or vice versa) or can overlap/exist in any other suitable manner.

Processor(s) 150 can be arranged to send instructions to and to receive instructions from or for various components such as, the sensor system 160, the propulsion system 170, the power system 172, the navigation system 174, and the communications system 176.

Sensor system 160 can include any number of onboard cameras 162, such as digital and/or video cameras, which can be used to capture images/video (referred to herein collectively as a camera 'feed' or 'clip') in order monitor the surroundings/environment of vehicle 102 while parked and/or while moving. Sensor system 160 can also include any number of sensors 164, such as Light Detection and Ranging (LiDAR) sensors, radar sensors, ultrasonic sensors, microphones, altimeters, parking sensors, glass break sensors, impact sensors, door/trunk/frunk opening/closing sensors, alarms, etc., that can also be used to ascertain when objects are near the vehicle 102, to monitor the external surroundings/environment and/or internal environment/status of the vehicle 102 while parked and/or while moving, and/or propulsion system sensors that can monitor drive mechanism performance, drive train performance, and/or power system levels.

In at least one embodiment, the sensor system 160 can be configured with security logic 166, such as a security application, that can be configured to manage an onboard security monitoring mode for the vehicle 102 in accordance with embodiments herein, for example, which vehicle is at a parked location (e.g., parking lot 106). In at least one embodiment, security data 156, such as images, video, sensor data, alarm data, etc. may be obtained from sensor system 160/security logic 166 and/or from one or more external security cameras (as discussed for embodiments herein) and stored, analyzed, etc. via storage 154. In at least one embodiment, security data 156 may include an indication of an onboard security monitoring mode selected for vehicle 102 via security logic 166 based on various external camera availability/capability information obtained by the vehicle 102 for a given parked location, as well as timestamp information indicating when a given onboard security monitoring mode is entered and exited for the vehicle 102.

In at least one embodiment, security data 156 may include one or more user preference(s) that a user/driver of the vehicle 102 may configure for onboard security monitoring mode operations involving the vehicle 102. In at least one embodiment, user preferences can include an indication selecting certain onboard security monitoring modes at certain parked locations (e.g., airport vs. shopping mall vs. grocery store). In at least one embodiment, user preferences can include an indication selecting certain onboard security monitoring modes at certain parked locations in combination with various external security criteria (e.g., selecting to disable onboard security at an airport if external security cameras are available/capable of monitoring the vehicle, or selecting to enable a certain light/partial (intermediate) onboard security monitoring mode level at a shopping mall based on one or more external cameras be available/capable of monitoring the vehicle). In at least one embodiment, user preferences can include an selecting certain onboard security monitoring modes at certain parked locations in combination with one or more of external security criteria, time-based or temporal preferences (e.g., selecting different onboard security monitoring modes based on day/time of day criteria), and/or historical data (e.g., indicating amount of time parked at a particular location, which can influence selection of an onboard security monitoring mode), and/or the like.

Other security data 156 may be stored via storage 154 in accordance with embodiments/examples provided and/or envisioned through the present disclosure.

The propulsion system 170, or a conveyance system, is arranged to cause the vehicle 102 to move, e.g., drive. For example, when the vehicle 102 is configured with a multi-wheeled automotive configuration as well as steering, braking systems and engine(s), the propulsion system 170 may be arranged to cause the engine, wheels, steering, and braking systems to cooperate to drive through any combination human control and/or autonomous control. The propulsion engine(s) may include any combination of gas engine(s), turbine engine(s), electric motor(s), hybrid gas and electric engine(s), and/or the like.

The power system 172 is arranged to provide power to the vehicle 102. Power may be provided as electrical power, gas power, or any other suitable power, e.g., solar power or battery power. In one embodiment, the power system 172 may include a main power source, and an auxiliary power source that may serve to power various components of the vehicle 102 and/or to generally provide power to the vehicle 102 when the main power source does not have the capacity to provide sufficient power to the vehicle 102.

The navigation system 174 can interact with and/or, in some instances, may control propulsion system 170 for navigation of the vehicle 102 along paths, roads, etc. The navigation system 174 may include navigation data 158 or information, such as at least one of digital maps, street view photographs, a global positioning system (GPS) point, and/or any other location information that may be used to identify a location or locations of the vehicle 102. In at least one embodiment, navigation data 158 that may indicate a location of vehicle 102 for a given parked location/in a parked state (e.g., at parking lot 106) may be stored via storage 154. In at least one embodiment, navigation data 158 can include time/temporal information (e.g., times/days that vehicle 102 is parked at one or more locations), which can be used to generate historical information for parking tendencies, patterns, etc. involving operation of vehicle 102. In another example, map data/maps may be utilized in cooperation with cameras 162 and/or sensors 164 included in sensor system 160 to enable monitoring of an environment/surrounding for the vehicle 102 based on a selected onboard security monitoring mode.

The communications system 176 allows the vehicle 102 to communicate, for example, wirelessly via wireless network node(s) 132, with vehicle server 110. Communications system 176 generally obtains or receives data (e.g., external camera availability/capability information, images/videos (referred to herein collectively as a camera 'feed' or 'clip'), etc., as discussed for embodiments herein) from vehicle server 110, stores the data, and/or transmits or provides data to vehicle server 110 (e.g., a selected onboard security monitoring mode for vehicle, etc. as discussed for embodiments herein).

As will be appreciated by those skilled in the art, vehicle 102 may be characterized as any combination of autonomous/non-autonomous vehicle, which can operate through any combination of fully autonomous operation, semi-autonomous operation (e.g., partially under control of a human operator), or fully human controlled operation.

With reference again to FIG. 1A, operations of system 100 may broadly include providing a connected vehicle, such as vehicle 102, with contextual or "security" awareness regarding the availability and/or capabilities of one or more external security cameras (e.g., provided for a parking lot) that may be available/capable of providing of providing images (e.g., an image/video feed/clip) for the surrounding environment proximate to/in the vicinity of the location at which the vehicle 102 is parked/is in a parked state.

For example, when parked at parking lot 106, vehicle 102 may send its location information to vehicle server 110, which can trigger vehicle server 110 to query camera server 120 regarding various camera information for the vehicle 102 location, such as availability and/or capabilities of various cameras that may be installed at/proximate to/near/ in the vicinity of the vehicle 102 location, such as cameras 104(1) and 104(2).

In some embodiments, the vehicle server 110 may include in its request to camera server 120 a range of locations/ coordinates, etc. that define an area for the location of the vehicle 102. Based on the query and location information identified therein, the camera server 120 can identify via camera database 122, one or more cameras, such as cameras 104(1) and 104(2), that are in the vicinity of the parked location of the vehicle 102 and can return availability and/or capability information for the cameras to vehicle server 110.

In various embodiments, availability information may include a health/functionality and/or a connectivity indicator (e.g., connectivity to camera server 120 indicating that a camera feed/clip of image/video data is available) for each camera 104(1) and 104(2), such as operating normal/fully functional and/or having full connectivity (e.g., camera feed operational), operating with certain capabilities/functionalities disabled/not functioning and/or having limited connectivity (e.g., limited camera feed, potentially indicating the type of connectivity that is limited, such as limited cellular connectivity, etc.), or not operating/non-functional and/or having no connectivity (e.g., no camera feed available), and/or the like.

In various embodiments, availability information may include location information and/or the visual/viewing/ viewable range/area of each camera 104(1) and 104(2) (e.g., latitude/longitude, GPS location, network reported location, and/or other coordinate information that can define the (potential) visual coverage area or 'view' of cameras).

In various embodiments, capability information for each of camera 104(1) and 104(2) may include indications regarding any combination of resolution capabilities, color/ non-color capabilities, night vision capabilities, tilt capabilities, pan/rotation capabilities, zoom capabilities, and/or the like. In some embodiments, capability information may also include location information indicating the visual/viewable coverage area of the cameras (e.g., latitude/longitude and/or other coordinate information that can define the (potential) visual coverage area or 'view' of cameras), which can vary for cameras that are capable of tilt/pan/zoom operations of which the cameras may be capable of performing.

Figure 1D:
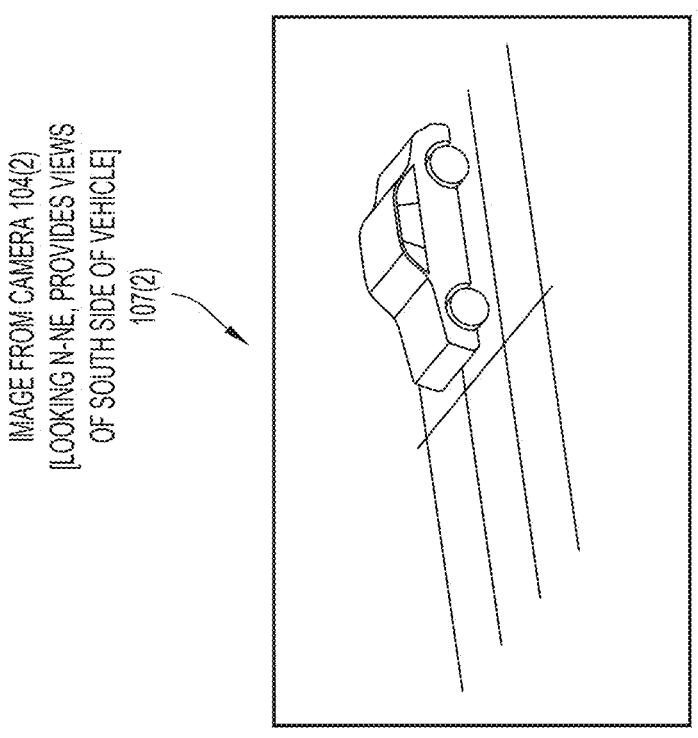
FIGS. 1C and 1D are diagrams illustrating example images that may be captured by external cameras of the system of FIG. 1A, according to an example embodiment.
Figure 1C:
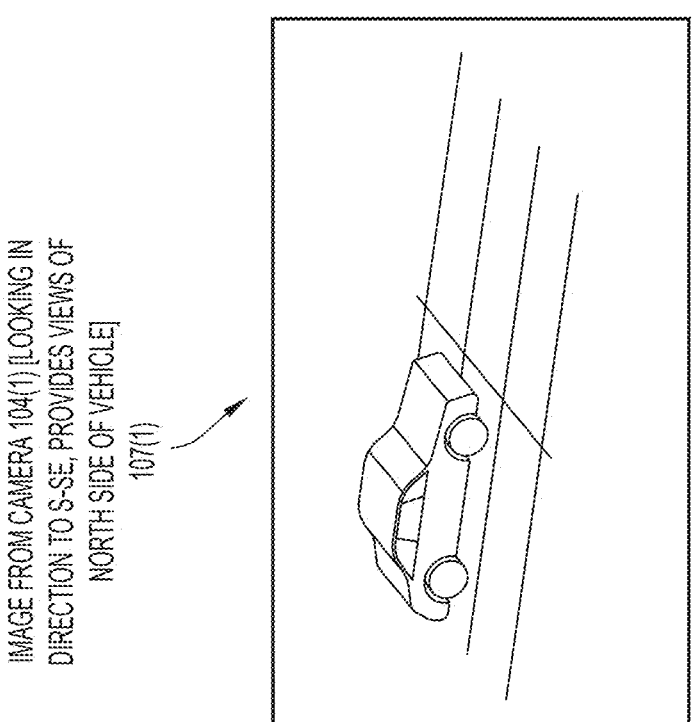

In at least one embodiment, the camera information (availability and/or capability information) can include images/video recorded by the cameras 104(1) and 104(2), which can potentially include images/video of the vehicle 102 at the location of the parking lot 106, in order to provide viewable/viewing area of each of the cameras to the vehicle 102. For example, FIG. 1C illustrates an example image 107(1) that may be obtained from camera 104(1) illustrating the viewable/viewing area of which camera 104(1) is capable of providing and FIG. 1D illustrates an example image 107(2) that that may be obtained from camera 104(2) illustrating the viewable/viewing area of which camera 104(2) is capable of providing.

For example, camera 104(1) may have a viewing direction that faces south/south-east and therefore can provide external security views/images for the north side of the vehicle 102 and camera 104(2) may have a viewing direction that faces north/north-east and therefore can provide external security views/images for the south side of the vehicle 102.

The vehicle server 110 can provide an indication to the vehicle 102 that includes the camera information indicating the availability and/or capabilities of the cameras 104(1) and 104(2) provided at parking lot 106 to the vehicle 102. In at least one embodiment, the vehicle server can generate a map or graph indicating the location of the vehicle 102 and the location of the cameras 104(1) and 104(2) that can be included in the indication sent to the vehicle 102. In at least one embodiment, the map/graph may include indications of the viewable coverage area of each of the cameras relative to the location of the vehicle 102.

Upon obtaining, by the vehicle 102 from vehicle server 110, the indication regarding the availability and/or capabilities of one or more external security cameras for the given location of the vehicle (e.g., cameras 104(1) and 104(2)), the vehicle 102 can, based on the indication (camera availability and/or capability information, potentially including image(s) from the camera(s)) and potentially based on user/driver preferences, determine (via security logic 166) whether to:

Activate a full onboard security monitoring mode for the vehicle 102 in which the vehicle 102 determines/ indicates that it will operate onboard security monitoring with its full set of onboard security sensors, alarms, and cameras and not leverage surveillance/images from external cameras;

Activate a 'light'/partial or 'intermediate' onboard security monitoring mode for the vehicle 102 in which the vehicle 102 determines/indicates that it will operate onboard security monitoring with a reduced set/subset of onboard security sensors/alarms/cameras (e.g., only a portion of the onboard security monitoring devices are enabled) and intends leverage some surveillance/ images provided by external cameras, which can help to reduce battery drain for the vehicle 102; or.

Disable the onboard security monitoring for the vehicle 102 altogether in which the vehicle 102 determines that it will disable all onboard security cameras and subset(s) of sensors and alarms relevant to visual/ security triggers in order to leverage surveillance/images provided by the external cameras, which can help to reduce battery drain for the vehicle (more than the partial/light onboard security monitoring mode).

The vehicle 102 can notify the vehicle server 110 regarding the selected onboard security monitoring mode. In some embodiments, if the vehicle 102 selects the partial/light, referred to herein as intermediate, onboard security monitoring mode or to disable the onboard security monitoring mode, the vehicle 102 can identify specific camera(s) (e.g., one or both of cameras 104(1) and 104(2)) that the vehicle 102 seeks to leverage to provide external surveillance/ security for the vehicle 102. In various embodiments, different sets/subsets of available onboard cameras, sensors, and/or alarms can be enabled/disabled to facilitate different levels of an intermediate onboard security monitoring mode selected by the vehicle 102 (e.g., disabling all cameras 162 and keeping all sensors/alarms enabled for a first level intermediate onboard security monitoring mode, disabling certain cameras on one or more sides of the vehicle based on availability of external security cameras providing security/ surveillance on those side(s) and keeping all sensors/alarms enabled for a second level intermediate onboard security monitoring mode, etc.).

The vehicle server 110 can store the vehicle 102 selection along with the ID for the vehicle 102 and a timestamp indicating the time at which the vehicle 102 entered/started the selected onboard security monitoring mode. In some embodiments, the time/timestamp may be included in the notification sent by the vehicle 102 to the vehicle server 110. In some embodiments, the vehicle 102 can send additional information to the vehicle server 110, such as battery level information for the vehicle 102, onboard camera (162) information for the vehicle 102, image(s)/view information captured by the onboard cameras (e.g., a 360° snapshot), and/or user/driver onboard security monitoring mode preferences.

Upon determining, by the vehicle server 110, that the vehicle 102 has selected to enable the intermediate onboard security monitoring mode (meaning that some surveillance/ security for the vehicle 102 is to be offloaded to/leveraged by operations of cameras 104(1) and/or 104(2)) or that the vehicle 102 has selected to disable the onboard security monitoring mode (meaning that all surveillance/security for the vehicle is to be offloaded to/leveraged by cameras 104(1) and/or 104(2), except for any security event monitoring/ detection that may be performed by security logic 166), the vehicle server 110 can periodically query the camera server 120 to obtain the health/connectivity (e.g., status) of selected camera(s) and/or to obtain feeds/clips (images and/or video) from the selected camera(s). The vehicle server 110 can provide the status of the camera(s) and image(s) to the vehicle 102. The vehicle 102 can analyze (e.g., via security logic 166) the status/image information to determine/detect the occurrence of potential security events (e.g., break-ins, tampering, etc.) involving the vehicle 102.

If a change in the health/connectivity of a particular camera changes (changed camera status), the vehicle server 110 can notify the vehicle 102 regarding the changed status. In some embodiments, the vehicle 102 can select a different onboard security monitoring mode based on the changed status (and potentially user preference(s)) and can notify the vehicle server 110 of the selected onboard security monitoring mode, along with a timestamp for the change.

In some embodiments, the vehicle 102 can select to change the onboard security monitoring mode based on user preference(s), security event(s), and/or condition(s) of the vehicle 102/battery level of the vehicle. For example, in some embodiments, if the vehicle 102 determines that the overall battery level of the vehicle drops below a certain threshold (e.g., a power level, a range of driving threshold, etc.), the vehicle 102 can automatically select to disable all onboard security monitoring devices (cameras, sensors, etc.)

and can notify the vehicle server 110 of the selected onboard security monitoring mode, along with a time stamp for the change.

Other scenarios for triggering a change to the onboard security monitoring mode selected by the vehicle 102 can be envisioned. For example, for instances in which the vehicle 102 determines a security event based on any non-visual sensors (e.g., glass-break sensors, impact sensors, door opening sensors, etc.) and/or alarms being triggered while the vehicle 102 is in either the intermediate or disabled security mode, then the vehicle 102 can revert back to the full onboard security mode.

The vehicle 102 can also monitor, for example, via security logic 166, when the driver of the vehicle 102 returns to/enters the vehicle (e.g., via a key fob, smartphone app, etc. carried by the driver) and can exit the selected onboard security monitoring mode. The vehicle 102 can send a notification to the vehicle server 110 that indicates that the vehicle 102 has exited the selected onboard security monitoring mode. In at least one embodiment, the notification can include a time/timestamp for the time at which the vehicle 102 exited/ended the selected onboard security monitoring mode.

The vehicle server 110 can mark security data maintained for the vehicle 102 via vehicle database 112 to indicate that the selected onboard security monitoring mode is exited, along with the timestamp value for time at which the vehicle 102 exited the selected onboard security monitoring mode. Thus, the vehicle server 110 can remove the vehicle 102 from further monitoring/updates to be managed/sent from the vehicle server 110 to the vehicle 102. In some embodiments, the vehicle server 110 can maintain an overall elapsed time indication for the total amount of time that the vehicle 102 was in the selected onboard security monitoring mode (e.g., calculating a difference between the starting and ending timestamps).

In some embodiments, if the vehicle 102 selects the intermediate onboard security monitoring mode or to disable the onboard security monitoring mode, the vehicle server 110 can assign a 'green score' indicating an amount of battery/power savings realized for the vehicle 102 and can send a notification to the vehicle regarding the assigned green score.

Accordingly, embodiments herein can utilize any combination of data/databases that correlate external/smart cameras that may be available at different parking lots (along with capabilities of the cameras) in which the cameras/feeds provided thereby can be used to enhance security/surveillance for vehicles parked thereat. Thus, when a driver/owner parks a vehicle, such as vehicle 102, the location of the vehicle can be pushed to the vehicle server 110, which then constructs a graph of existing surrounding security cameras based on camera information obtained from camera server 120. The vehicle server 110 can push the constructed graph to the vehicle, allowing the vehicle to make a smart decision regarding entering into an intermediate onboard security monitoring mode (using reduced onboard camera feeds-based monitoring) or to exit/disable the onboard security monitoring mode altogether.

Different intermediate onboard security monitoring modes or levels can be envisioned, as discussed above, such that onboard alarms and sensors 164 may still be activated in some intermediate modes/levels that can be used to trigger detection of certain lower priority security events such as jarring of the vehicle 102, door dings, etc., while external camera-based surveillance may be used for detecting higher priority events, such as unauthorized entry into the car, shattering of glass panels on the car, etc.

The vehicle server 110 can monitor the connectivity and functionality of the security cameras in the graph to ensure continued surveillance, thus enabling the vehicle to remain in the selected intermediate onboard monitoring or disabled onboard monitoring mode. Various APIs can be leveraged/exposed to the elements of system 100 to facilitate various interactions/communications.

In at least one embodiment, the available camera details/status and parking location of the vehicle can be correlated in real time by camera server-API feeds into the vehicle server 110, which can be leveraged by vehicle server 110 to construct a graph/map of available external cameras/camera capabilities that can be pushed to the vehicle 102. For any reason, if a given camera feed is not or stops working, the vehicle server 110 can push a notification to the vehicle 102, allowing the vehicle to make an updated onboard security monitoring mode selection, potentially selecting to enable a full onboard security monitoring mode or an updated intermediate onboard security monitoring mode.

Embodiments herein consider that camera information/camera feed information and details are accessible to the vehicle server 110 or accessible via an API in which such information can be used to determine the availability/capability information of camera(s) in the vicinity of a parked vehicle and/or for sending notifications to alert the vehicle to regarding a changed camera status in order to allow the vehicle 102 to select a different onboard security monitoring mode. Thus, camera feeds/details of external cameras, such as cameras 104(1) and 104(2), can be provided through any combination of local networks, cloud networks, and/or the like (e.g., networks 130).

For instances in which the (connected security) camera server 120 is offered by the same operator as that of the connected vehicle server 110 provider, common databases may be used/shared to exchange different information. Alternatively, a security camera operator can provide an API to inform the vehicle server 110 regarding the real-time status of the operational state of the camera and/or real-time images/feeds of the camera. The sharing of recordings/clips may be subject to legal and official agreements.

Consider various example operations that may be performed via system 100 to facilitate providing context-aware security for vehicle 102, as discussed with reference to FIGS. 2A, 2B, and 2C, which are a sequence diagram 200 illustrating different operations/communications that can be performed via system 100, according to various example embodiments.

Figure 2A:
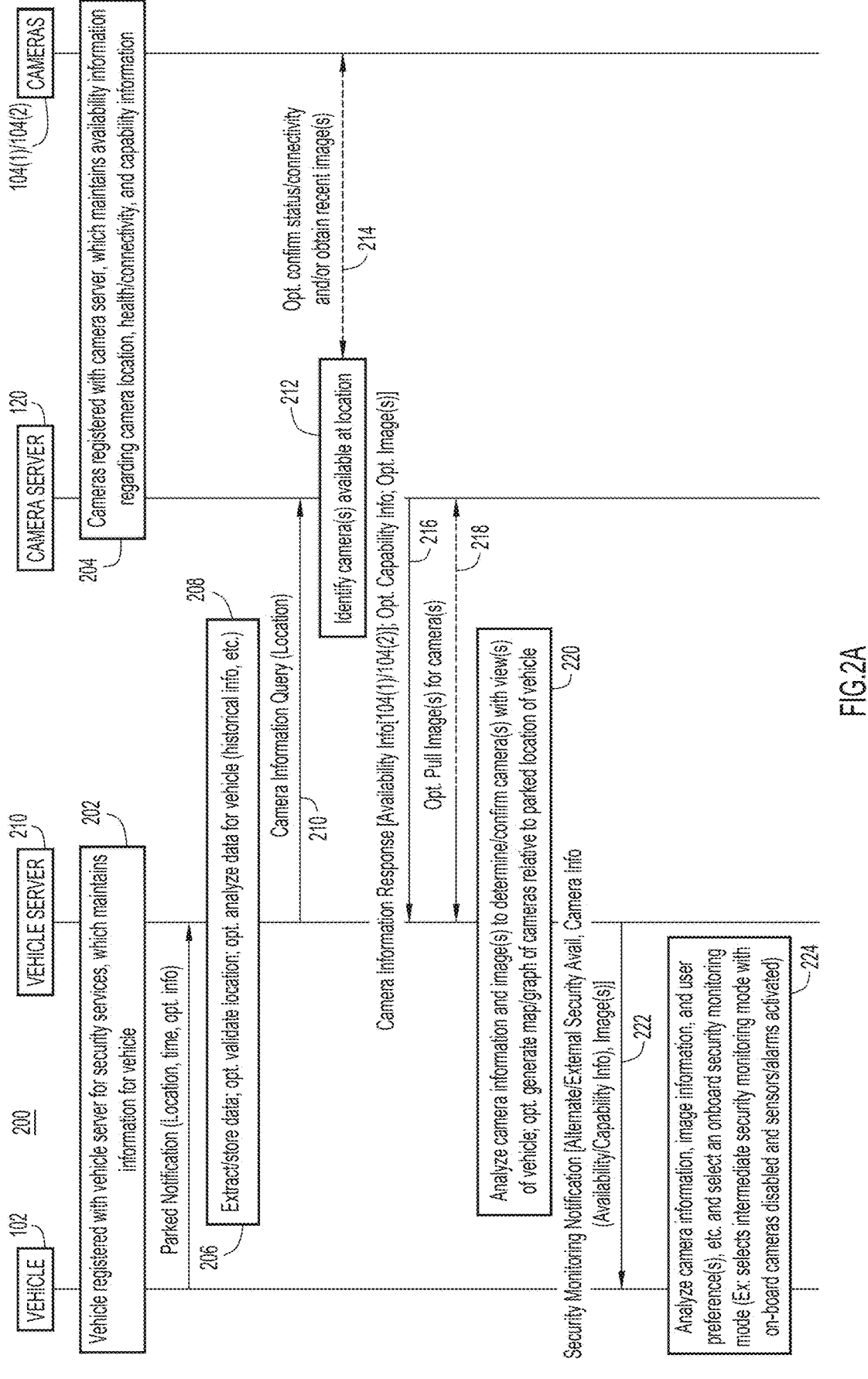
FIGS. 2A, 2B, and 2C are a sequence diagram illustrating example operations that can be performed to facilitate context-aware security for a connected vehicle, according to an example embodiment.
Figure 2B:
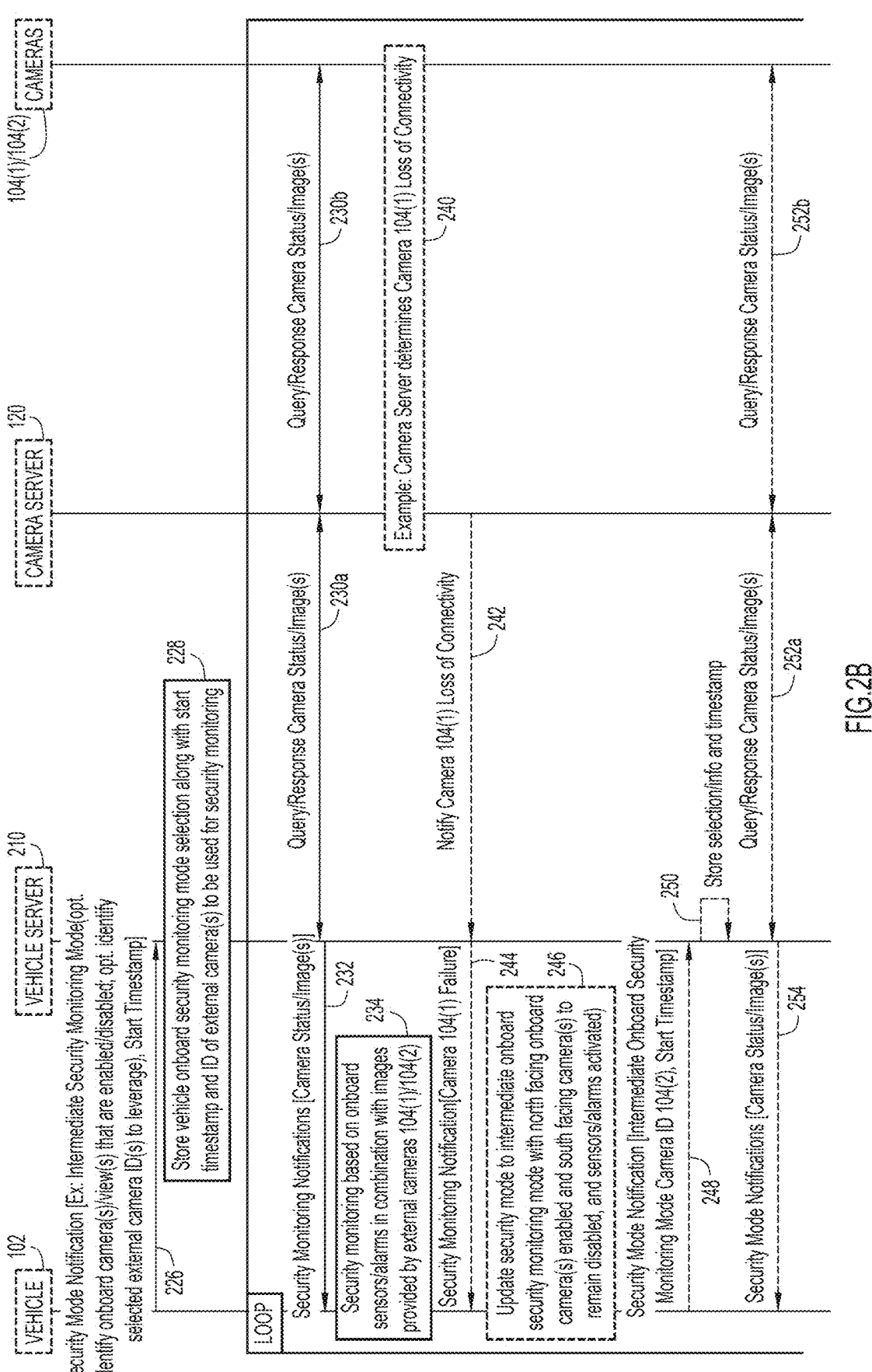
Figure 2C:
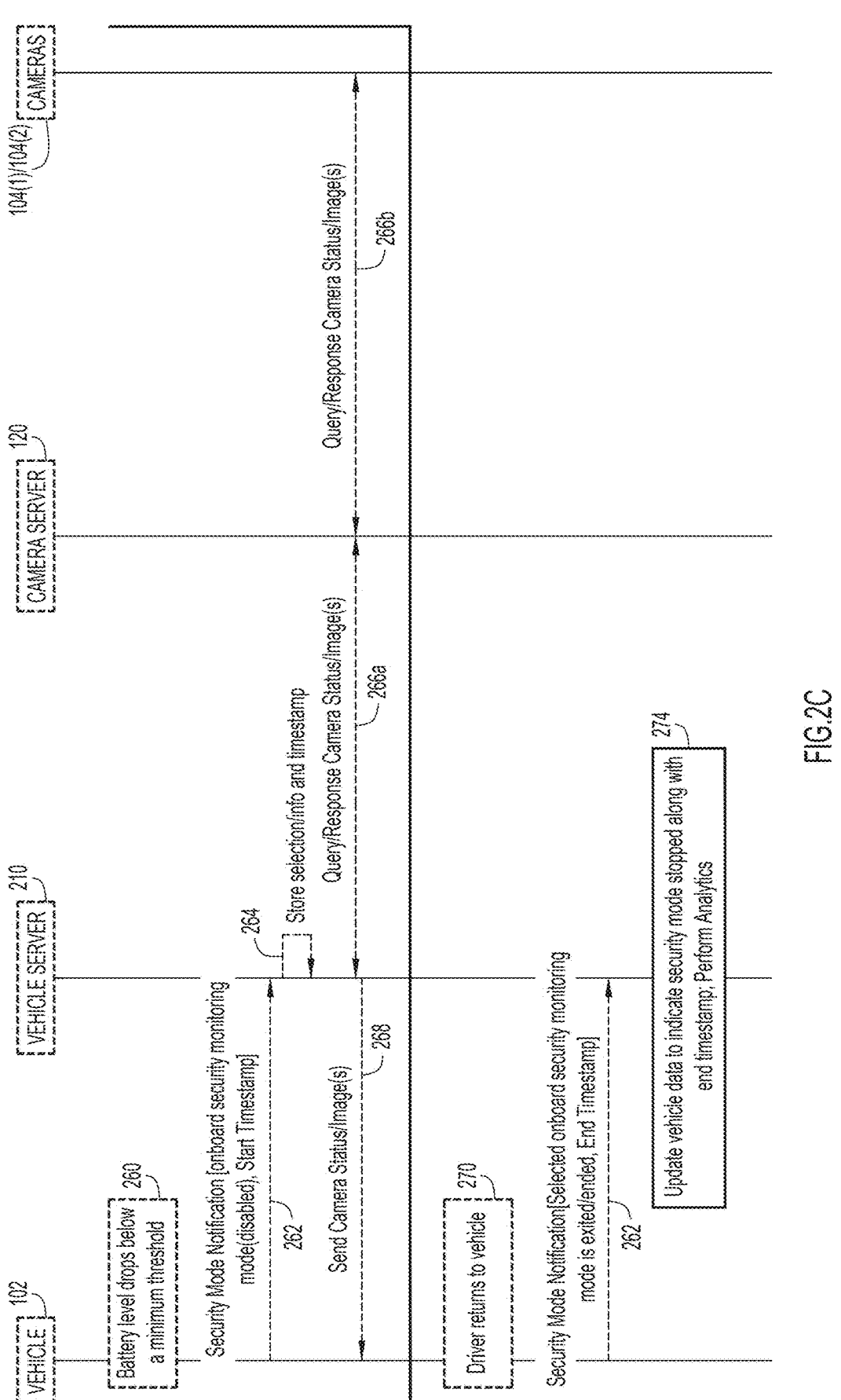

FIGS. 2A, 2B, and 2C include vehicle 102, vehicle server 110, camera server 120, camera 104(1), and camera 104(2).

Broadly, FIGS. 2A, 2B, and 2C illustrate example operations/communications that may be utilized via system 100 to inform vehicle 102 regarding the availability and/or capabilities of one or more external security cameras, such as cameras 104(1) and 104(2) that may be used provide surveillance/security for a location at which the vehicle is parked (e.g., parking lot 106). From the awareness regarding the availability and/or capabilities of the one or more external cameras, the vehicle can determine an onboard security monitoring mode to provide for the vehicle while parked at the location. Status updates regarding the cameras and/or image/video feed updates from the cameras can be provided to the vehicle 102 to facilitate security/surveillance for the security and/or to allow the vehicle to select an updated onboard security monitoring mode, as discussed through various examples.

As shown at 202, consider that vehicle 102 is registered with the vehicle server 110 for security services (e.g., context-awareness regarding the availability/capability of one or more external security cameras for parked location(s) of the vehicle 102) in which the vehicle server 110 maintains/stores various information for the vehicle 102 (e.g., any combination vehicle ID information, user/driver information, user/driver preferences, historical data regarding parked location(s) of the vehicle/time spent at parked location(s), etc.) via vehicle database 112 (not shown). In one instance, a vehicle server application can be installed on the vehicle 102 that can facilitate the registration with vehicle server 110 and additional communications between the vehicle 102 and the vehicle server 110 for embodiments herein.

At 204, consider that cameras 104(1) and 104(2) are registered with the camera server 120. In at least one embodiment, registration of the cameras 104(1) and 104(2) can include the camera server 120 registering a geographic location of the cameras, parking lot information/location information associated with the cameras, determining an operating state of the cameras and ID information of the cameras (e.g., serial number, IP address, MAC address, etc.), capability information for the cameras (e.g., resolution, color/non-color capabilities, night vision capabilities, tilt capabilities, pan capabilities, zoom capabilities, etc.), visual/viewable coverage area of the cameras, and/or any other information for the cameras in which such information can be stored via camera database 122. In some instances, the camera server 120 can generate maps/graphs of the cameras in relation to locations/viewable areas of the cameras for different locations.

At 206, consider that the vehicle 102 parks at a given parking location, such as within a parking space of parking lot 106 and securely transmits a notification to vehicle server 110 (via wireless network node(s) 132) that the vehicle is parked in which the notification may include at least a location indication indicating the parked location of the vehicle 102 along with identifying information for the vehicle and/or the user/driver of the vehicle (e.g., user/driver ID, vehicle VIN, etc.), potentially linked to the application for the vehicle 102 and/or user/driver of the vehicle that can be registered with vehicle server 110 (e.g., app ID, etc.). For example, sensors 164 of the vehicle 102 can detects when the vehicle has come to stop and is in a parked state in order to trigger sending the notification to the vehicle server 110.

In at least one embodiment, the location indication sent by the vehicle 102 can include GPS coordinates obtained by the navigation system 174 of the vehicle indicating the current location coordinates of the vehicle 102. Other location coordinates can be envisioned.

In some embodiments, the notification sent by the vehicle at 206 can include a timestamp indicating the parked time for the vehicle. Other information may be included in the notification in some embodiments, such as an indication of the battery level of the vehicle 102, one or more images captured by cameras 162 of the vehicle (e.g., 360° view(s)), and/or one or more user/driver preferences regarding onboard security monitoring as configured by the user/driver (e.g., indicating whether the user has enabled external security monitoring as an option for vehicle security monitoring, other security settings, whether the user has defined a particular onboard security monitoring mode to be used at specific locations (e.g., parking lot 106) or has enabled auto onboard security mode selections to be performed by the vehicle, etc.).

As shown at 208, the vehicle server 110 extracts the location indication and any other data/information from the notification sent by the vehicle 102 and stores the data/ information in combination with ID information for the vehicle and/or the user/driver in vehicle database 112 (e.g., vehicle/driver ID <=> [GPS location/Lat-Lon location] [parked time][battery level/driver preferences/other vehicle reported data]).

In some embodiments, the vehicle server 110 can validate the reported location of the vehicle. In at least one embodiment, the validation can be performed based on cellular data obtained through a wireless network node, such as a 3GPP gNodeB, to which the vehicle 102 is connected in which the wireless network node can provide a network reported location for the vehicle. For example, wireless network nodes may have defined coverage area, tracking areas (Tracking Area Identifiers (TAIs)), identifiers (cell identifiers) etc. that can be associated with geographic areas served by the wireless network nodes. Such information may be considered network reported location information (e.g., TAI, cell ID, etc.) that can be included in communications for the vehicle 102 that are communicated between the wireless network nodes to the vehicle server 110, which the vehicle server can use to validate the vehicle reported location (location indication included in the notification sent at 206).

In at least one embodiment, the vehicle server 110 can analyze (at 208) historical information for the vehicle 102 and/or the actual parked location of the vehicle (e.g., if the vehicle is parked at an airport, etc.) to determine an estimate for the amount of time/average parking time that the vehicle may remain at the parked location in order to determine whether to inform/notify the vehicle 102 regarding the availability of alternate external security monitoring for the vehicle 102 at parked location (e.g., parking lot 106). In at least one embodiment, the vehicle server 110 can analyze (at 208) other information obtained from/stored for the vehicle 102, such as user/driver preferences in order to determine whether to inform/notify the vehicle 102 regarding the availability of alternate external security monitoring for the vehicle 102 at the parked location (parking lot 106).

Under an assumption that vehicle server 110 determines that it is to notify the vehicle regarding the availability of alternate external security monitoring for the vehicle 102 at parked location, the vehicle server 110 sends a camera information query message to camera server, as shown at 210, that includes, at least in part the location indication of the vehicle 102 as reported by the vehicle and/or as validated by the vehicle server 110. In some embodiments, location information such as coordinates identifying a range or geographic area (e.g., a geofenced area) relative to the parked location of the vehicle 102 and/or acceptable distances relative to the parked location of the vehicle (e.g., less than or equal to some threshold, such as 30 meters, or the like) may be sent to the camera server 120 in which the location may provide additional information that the camera server 120 can utilize to identify available camera(s) that may be near/in the vicinity of the parked location of the vehicle.

As shown at 212, the camera server 120 can identify one or more external cameras that may be available at or near/in the vicinity of the parked location of the vehicle 102 that can be used to provide external security monitoring/surveillance for the vehicle 102 while at the parked location. In at least one embodiment, the identifying at 212 can be based on information obtained from/for the cameras through the registration at 204. In this example, consider that camera server 120 identifies cameras 104(1) and 104(2) as being available to provide external security monitoring for the vehicle 102 at the parked location. In at least one embodiment, camera server 120 can confirm the real-time availability/status of the cameras 104(1) and 104(2), as shown at 214, based on additional communications with the cameras (e.g., a green status can indicate that cameras are working and performing surveillance, a red status can indicate that the cameras are not working/not performing surveillance, an orange status can indicate that the cameras are working and performing surveillance but may have limited connectivity/throughput, etc.). The additional communications at 214 may also be used to obtain current/real-time images/feeds from the cameras.

As shown at 216, the camera server 120 sends a camera information response message to the vehicle server 110 that includes, at least in part, availability information indicating the cameras 104(1) and 104(2) that are available at the parked location of the vehicle 102 to provide external security monitoring for the vehicle 102. In at least one embodiment, the response sent by the camera server 120 may include capability information for each of the cameras 104(1) and 104(2) (e.g., resolution, color/non-color capabilities, night vision capabilities, tilt capabilities, pan/rotation capabilities, zoom capabilities, etc.). In at least one embodiment, the response sent by the camera server 120 may include image(s)/feed(s) obtained from the cameras 104(1) and 104(2). In at least one embodiment, the vehicle server 110 can separately perform a query for image(s)/feed(s) for the cameras as generally shown at 216, for example, if not included in the camera information response message at 218.

In various embodiments, the camera information query/ response communications can be facilitated by APIs configured for the vehicle server 110, the camera server 120 and cameras connected thereto, such as a connected security camera API, a camera view API, and/or the like.

Upon obtaining the camera information response from the camera server 120, the vehicle server 110 can analyze the camera information (i.e., availability information and optionally capability information and/or image(s)) for the cameras 104(1) and 104(2) to determine or confirm that the cameras provide view(s) of the vehicle 102 at the parked location. In at least one embodiment, the operations at 220 can include image processing operations to correlate images obtained from the vehicle 102 (e.g., at 206) with images obtained from the camera server 120/cameras 104(1)/104(2) to perform an image-based location determination for determining/confirming that the cameras 104(1) and 104(2) are in the vicinity of and capable of viewing the vehicle 102. The image processing operations/analysis may include consideration of angular and spatial mobility capabilities (e.g., remote control, tilt, pan/rotation, zoom, etc.), low light capabilities, and/or any other capabilities of the cameras 104(1)/104(2).

In at least one embodiment, the vehicle server 110 can use such image processing operations to determine/identify a subset of the cameras indicated by the camera server 120 that may be usable to providing security/surveillance for the vehicle for different onboard security monitoring modes that may be selected by the vehicle 102 (e.g., intermediate onboard security monitoring or disabled onboard security monitoring).

In at least one embodiment, the vehicle server 110 can generate a map or graph of the cameras that the vehicle server 110 has identified are available/capable for providing external security monitoring for the vehicle 102 at the parked location of the vehicle 102. The map or graph may indicate the location of the cameras relative to the vehicle and may optionally indicate the viewable/viewing area of which the cameras are capable (e.g., triangulating the location of the cameras relative to the parked location of the vehicle 102). In at least one embodiment, a location analytics API can be utilized by the vehicle server 110 to perform the operations at 220. In at least one embodiment, a map/graph API can be utilized by the vehicle server 110 to generate the map/graph indicating the location of the cameras relative to the parked location of the vehicle.

Upon confirming that cameras 104(1) and 104(2) are available/capable for providing external security monitoring for the vehicle 102 at the parked location, the vehicle server 110 sends a security monitoring notification message to the vehicle 102, as shown at 222, in which the security monitoring notification identifies that alternate external security monitoring is available for the vehicle 102 at the parked location and includes a camera indication that includes availability information identifying cameras 104(1) and 104(2) as being available for monitoring the vehicle 102 at the parked location. In at least one embodiment, the camera indication may include capability information for the cameras. In at least one embodiment, the camera indication may include image(s)/feed(s) for the cameras 104(1) and 104(2). In at least one embodiment, a push API can be provided for the vehicle server 110 to facilitate sending the notification to the vehicle 102.

In various embodiments, the availability information may include camera ID information for the cameras 104(1) and 104(2), location information for the cameras, viewing/viewable area information for the cameras 104(1) and 104(2), and/or the like. In various embodiments, capability information for each of camera 104(1) and 104(2) may include indications regarding any combination of resolution capabilities, remote control capabilities, color/non-color capabilities, night vision capabilities, tilt capabilities, pan/rotation capabilities, zoom capabilities, and/or the like. In at least one embodiment, the security monitoring notification sent by the vehicle server 110 may include a recommended onboard security monitoring mode for the vehicle 102 (e.g., intermediate onboard security monitoring, etc.).

Moving to FIG. 2B, as shown at 224, the vehicle 102 can extract the data/information included in the security monitoring notification and analyze camera information and optionally image information obtained from the vehicle server 110, potentially in combination with user/driver preference(s), in order to select an onboard security monitoring mode for the vehicle 102. In at least on embodiment, the vehicle 102 may consider a recommended onboard security monitoring mode as indicated by the vehicle server 110 to perform the onboard security monitoring mode selection.

In at least one embodiment, based on receiving image(s)/feed(s) from the cameras 104(1) and 104(2) in the security notification from the vehicle server 110, the vehicle 102, via security logic 166, the operations at 224 can include image processing operations to correlate images obtained from the onboard cameras 162 of the vehicle 102 with images obtained from the vehicle server 110 to perform an image-based determination for determining/confirming whether cameras 104(1) and 104(2) are capable of viewing the vehicle 102, potentially considering angular and spatial mobility capabilities (e.g., remote control, tilt, pan/rotation, zoom, etc.), low light capabilities, and/or any other capabilities of the external cameras 104(1) and 104(2). In some embodiments, the image processing analysis/operations can correlate maximum visibility of cameras 162 to the potential visibility/viewing area of the external cameras 104(1) and 104(2). Thus, the vehicle can determine if image(s) from the external cameras 104(1) and 104(2) can be leveraged instead of one or more of the onboard cameras 162 of the vehicle 102 to facilitate security monitoring for the vehicle 102 at the parked location.

Based on the analysis of the information obtained from the vehicle server 110, the vehicle 102 can a corresponding onboard security monitoring mode for the vehicle 102, from one of: a first onboard security monitoring mode in which all onboard security monitoring cameras, sensors, and alarms for the vehicle are to be enabled (e.g., full onboard security monitoring mode is selected/enabled for the vehicle); a second onboard security monitoring mode in which only a portion of the onboard security monitoring cameras, sensors, and/or alarms for the vehicle are enabled (e.g., a partial/light/intermediate onboard security monitoring mode is selected/enabled for the vehicle); and a third onboard security monitoring mode in which all of the onboard security monitoring cameras, sensors, and alarms for the vehicle are disabled (e.g., disabling onboard security monitoring is selected for the vehicle).

In some embodiments, the onboard security monitoring mode analysis performed by the vehicle 102 can include determining particular external camera(s) (as identified to the vehicle by the vehicle server 110) that the vehicle 102 seeks to leverage for external security monitoring to be provided for the vehicle. For example, the vehicle could select one of camera 104(1) or 104(2) to leverage.

As shown at 226, the vehicle 102 can send a security mode notification message to the vehicle server 110 that includes a security mode indication that identifies the onboard security monitoring mode selected by the vehicle 102 (based, at least in part, on the camera information obtained from the vehicle server 110 and potentially based on user preferences).

In at least one embodiment, the security mode notification message can identify one or more onboard camera(s)/camera view(s) that are enabled and/or disabled for the selected security monitoring mode, if the selected mode is the intermediate mode or disabled onboard security monitoring mode.

In at least one embodiment, the security mode notification message can include an indication of one or more external cameras (camera ID(s)) that the vehicle has selected to leverage for external security monitoring for the vehicle 102.

In at least one embodiment, the security mode notification message may include one or more update criteria indicating when the vehicle 102 seeks to receive external security camera availability/status and/or image updates from the vehicle server 110 while the vehicle 102 is at the parked location. For example, in some embodiments, the vehicle 102 can indicate that it seeks to receive periodic updates, indicating an update time interval (e.g., every 3-5 minutes, every 30 minutes-1 hour (e.g., if parked at an airport etc.)), different time intervals for different times of a day, etc. In some embodiments, the vehicle 102 can indicate that it is to receive updates when the vehicle server 110 receives updates from the camera server 120 (e.g., if the vehicle server 110 receives a notification from the camera server 120 that a given camera is not functioning/not connected, then the vehicle server 110 is to notify the vehicle 102 regarding the status update, if the vehicle server 110 obtains updated image(s)/feed(s) from the cameras, it is send the updated image(s)/feed(s) to the vehicle 102, etc.). Other variations and or combinations of criteria can be envisioned for providing security/status updates to a vehicle can be envisioned.

Different levels of intermediate onboard security monitoring may be available for selection by the vehicle 102. For example, in some embodiments, the vehicle may select an intermediate onboard security monitoring mode in which all onboard cameras 162 may be disabled and all sensors/alarms may be enabled, may select an intermediate onboard security monitoring mode in which certain cameras on one or more sides of the vehicle 102 may be disabled while leaving others enabled based on availability of external security cameras providing security/surveillance on certain side(s) of the vehicle 102 and keeping all sensors/alarms enabled, and or the like.

In the present example, consider that the vehicle 102 selects an intermediate onboard security monitoring mode in which all onboard cameras 162 are disabled for the vehicle 102 while all security sensors/alarms remain enabled for the vehicle 102 and includes an indication of the selected intermediate onboard security monitoring mode in the notification message sent to the vehicle server 110 at 226. Further, consider that the vehicle includes camera IDs in the notification indicating that both of external cameras 104(1) and 104(2) are to be used for security monitoring for the vehicle 102. In at least one embodiment, the vehicle 102 can include a start timestamp/timestamp value in the notification message.

As shown at 228, the vehicle server 110 extracts data/information from the received security mode notification message and stores the onboard security monitoring mode selection obtained from the vehicle and any other information identifies in the notification (e.g., external camera(s) that the vehicle has selected to leverage for monitoring, start timestamp, etc.) and stores the selection and the ID(s) of the camera(s) to be used to provide external security/surveillance monitoring for the vehicle via vehicle database 112 (e.g., vehicle/driver ID <=> [GPS location/Lat-Lon location][parked time][battery level/driver preferences/other vehicle reported data][vehicle selected onboard security monitoring mode][external camera ID(s)).

If no camera ID(s) are included in a security mode notification received from a vehicle but the vehicle has selected an onboard security monitoring mode that is to leverage external cameras, the vehicle server 110 may assume that all cameras identified to the vehicle via a security monitoring notification message are to be used for providing external security monitoring for the vehicle.

Once a selected onboard security monitoring mode is obtained by the vehicle server 110 for the vehicle 102, the vehicle monitoring server can flag the vehicle 102 to receive one or more subsequent security monitoring notifications from the vehicle server 110, which can include any combination of an availability status of each of the cameras 104(1) and 104(2) and/or image(s)/feed(s) obtained from the cameras 104(1) and 104(2). In some embodiments, the vehicle server 110 can set periodic status checks of the cameras that are to provide external security monitoring for the vehicle 102, based on internal update time interval settings or based on update criteria received from the vehicle 102.

For example, as shown at 230a and 230b, the vehicle server 110 can query camera server 120 to obtain availability/status updates (functioning/connected or not functioning/not connected) for cameras 104(1) and 104(2) and/or to obtain real-time/updated image(s)/feed(s) captured by cameras 104(1) and 104(2), which can be sent to the vehicle 102 via corresponding security monitoring notification message(s), as shown at 232. In at least one embodiment, the operations/communications at 230a/230b can be facilitated via a health check API that can be configured for the vehicle server 110, camera server 120, and cameras 104(1) and 104(2).

As generally shown at 234, the vehicle 102 can analyze, via security logic 166, the status updates and/or image(s), potentially in combination with any onboard sensor/alarm information (which are enabled in this example involving the selected intermediate security monitoring mode), in order to perform security monitoring for any security events involving the vehicle 102.

In one example, as shown at 240, consider that camera 104(1) loses connectivity with camera server 120 in which the loss of connectivity is communicated to the vehicle server 110 by camera server 120, as shown at 242, which triggers vehicle server 110 to send a security monitoring notification message to vehicle 102, as shown at 244, that includes a status update for camera 104(1) indicating that the camera has failed/lost connectivity.

Upon receiving the camera status update, the vehicle 102 can select an updated onboard security monitoring mode, as generally shown at 246. In one instance for the present example, the vehicle 102 can select a new intermediate onboard security monitoring mode that include enabling any cameras that provide north facing views for the external environment of the vehicle 102 [recall, camera 104(1) may have a viewing direction that faces south/south-east and therefore can provide (when operational) external security views/images for the north side of the vehicle 102] and keeping any cameras that provide south facing views for the external environment of the vehicle 102 disabled [recall, camera 104(2) may have a viewing direction that faces north/north-east and therefore can provide (when operational) external security views/images for the south side of the vehicle 102. In another instance, the vehicle 102 could select to enter the full onboard security monitoring mode in which all cameras, sensors, and alarms are to be enabled for the vehicle. Thus, embodiments herein facilitate the dynamic adjustment of onboard security monitoring modes for a vehicle.

In the present example, the vehicle 102 can send a security mode notification message to vehicle server 110 including an indication of the selected security mode, as shown at 248, that includes a timestamp associated with the onboard security monitoring mode selection. In this example, the vehicle 102 can include the camera ID for external camera 104(2) to be used to provide security monitoring for the vehicle 102.

As shown at 250, 252a, 252b, and 254, the vehicle server 110 can store the updated selection for the vehicle (via vehicle database 112), continue to obtain status/image updates for camera 104(2), and provide such updates to the vehicle 102.

Although the example at 240 involves detection of a loss of connectivity/failure of a given external camera, in some embodiments, security event detection can be performed by any combination of one or more external cameras, the camera server 120, and/or the vehicle server 110, such as detecting/determining that a person is tampering with/attempting to break-in to a given vehicle, detecting an impact with a given vehicle, and/or the like, which can trigger the vehicle server 110 to send one or more security monitoring notifications to a vehicle that has indicated that it seeks to leverage external security/surveillance. In various embodiments, such security event detection may be facilitated via using any artificial intelligence (AI), machine learning (ML) models and/or the like that can be trained to detect/estimate potential occurrence(s) of different security event(s)/AI triggered events through various image processing analyses, security environment data, and/or the like.

Moving to FIG. 2C, consider another example involving an updated onboard security monitoring mode selection being triggered for the vehicle 102. In this example, as generally shown at 260, consider that vehicle 102 is configured with a minimum battery threshold level such that, upon dropping below the minimum battery threshold level, the vehicle 102 is to disable all onboard security monitoring cameras, sensors, and alarms. In at least one embodiment, the minimum battery threshold level may be configured via user/driver preferences for the vehicle 102. In various embodiments, the minimum battery threshold can be defined in terms of estimated remaining range for the vehicle (e.g., 50 miles of range or less), a minimum battery threshold level or range (e.g., 10% power remaining), combinations thereof, and/or the like.

As shown at 262, in this example, upon determining that the battery level of the vehicle 102 is less than or equal to the minimum battery threshold level, the vehicle 102 can automatically select to disable all onboard security monitoring cameras, sensors, and alarms and can send a security mode notification message to the vehicle server 110 that indicates the updated selection and a corresponding start timestamp.

As shown at 264, 266a, 266b, and 268, the vehicle server 110 can store the updated selection for the vehicle (via vehicle database 112), continue to obtain status/image updates for any functioning/operational cameras, and provide such updates to the vehicle 102.

Any external security monitoring that the vehicle 102 seeks to leverage while at the parked location can continue until the user/driver of the vehicle 102 returns to the vehicle, enters the vehicle, and/or starts/drives the vehicle, as generally shown at 270, which can trigger the vehicle 102 to send a security mode notification message to the vehicle server 110 that indicates that the selected onboard security monitoring mode is exited/ended. In at least one embodiment, the message may include an end timestamp/timestamp value. The vehicle 102 can enable any cameras, sensors, and/or alarms that may have been disabled while parked at the parked location.

As shown at 274, the vehicle server 110 can mark/update the data stored for the vehicle 102 to indicate that the selected onboard security monitoring mode is stopped and that external security monitoring for the vehicle 102 is to stop/end, along with the ending time stamp. Thus, the vehicle server 110 can remove the vehicle 102 from receiving any subsequent update(s)/image(s) involving cameras 104(1) and 104(2).

In various embodiments, the vehicle server 110 can perform various analytics for the vehicle based on any combination of the parked time for the vehicle, any onboard security monitoring mode selections, etc. In at least one embodiment, the vehicle server 110 can calculate a green score for the vehicle 102 indicating an amount of battery/power saved by the vehicle by offloading security monitoring to one or more external cameras. Other analytics can be envisioned, such as determining driver tendencies, parked location tendencies, etc.

Accordingly, embodiments herein may facilitate context-aware security for connected vehicles.

Referring to FIG. 3, FIG. 3 is a flow chart depicting a method 300, according to an example embodiment. In at least one embodiment, method 300 illustrates operations that may be performed at least in part by a connected vehicle server, such as vehicle server 110 of FIG. 1A, to facilitate context-aware security for one or more connected vehicles, according to an example embodiment. In some embodiments, operations of method 300 can be performed in conjunction with operations performed by one or more connected vehicles, such as vehicle 102 of FIG. 1A, and/or a camera server, such as camera server 120 of FIG. 1A.

At 302, the method may include obtaining, by a vehicle server, a location indication including a parked location of a vehicle (e.g., as shown at 206 of FIG. 2A). In at least one embodiment, the vehicle server may additionally obtain one or more images of the environment of the parked location of the vehicle as captured by cameras of the vehicle at the parked location. Other information can be obtained by the vehicle server from the vehicle in accordance with embodiments herein.

At 304, the method may include identifying, by the vehicle server, at least one external security camera at the parked location of the vehicle that is available to monitor the vehicle. In at least one embodiment, the identifying can include sending a camera query to a camera server including the parked location of the vehicle, wherein the camera server manages a plurality of external security cameras for a plurality of parking locations and obtaining a camera response from the camera server that identifies the availability of the at least one external security camera that is capable of monitoring the vehicle at the parked location. In at least one embodiment, the camera response includes capability information for the at least one external security camera.

In at least one embodiment, the identifying at 304 can include performing image processing analysis to correlate images obtained from the vehicle 102 with images obtained from the camera server/cameras to perform image-based location determinations for determining/confirming that the at least one external camera is in the vicinity of and capable of viewing the vehicle at the parked location. The image processing operations/analysis may include consideration of angular and spatial mobility capabilities (e.g., remote control, tilt, pan/rotation, zoom, etc.), low light capabilities, and/or any other capabilities of the at least one external camera.

As shown at 306, the method may include providing, by the vehicle server, a camera indication to the vehicle (e.g., a security monitoring notification, as discussed at least for 222 of FIG. 2B) that identifies an availability of the at least one external security camera that is capable of monitoring the vehicle at the parked location. In at least one embodiment, capability information (e.g., low light/night vision, tilt, pan, zoom, etc.) for the at least one external security camera is included in the camera indication provided to the vehicle. In at least one embodiment, the camera indication can include a recommended onboard security monitoring mode that the vehicle server recommends for selection by the vehicle.

The vehicle can select an onboard security monitoring mode for the vehicle based, at least in part, on the camera indication obtained from the vehicle server. In at least one embodiment, the selection performed by the vehicle may be based additionally on one or more user/driver preferences for the vehicle.

The onboard security monitoring mode for the vehicle can be selected from a plurality of onboard security monitoring modes available for the vehicle, including: a first onboard security monitoring mode in which all onboard security monitoring cameras, sensors, and alarms for the vehicle are enabled; a second onboard security monitoring mode in which only a portion of the onboard security monitoring cameras, sensors, and/or alarms for the vehicle are enabled;

and a third onboard security monitoring mode in which all of the onboard security monitoring cameras, sensors, and alarms for the vehicle are disabled.

As shown at 308, the method may include obtaining, by the vehicle server, a security mode indication from the vehicle indicating an onboard security monitoring mode for the vehicle based, at least in part, on the camera indication.

As shown at 310, upon determining, based on the security mode indication, that the onboard security monitoring mode for the vehicle is associated with a mode in which only a portion of onboard security monitoring devices of the vehicle are enabled or in which all of the onboard security monitoring devices of the vehicle are disabled, the method may include providing at least one status update to the vehicle that include a camera status indication that includes at least one of: an operational status of the at least one external security camera; or one or more images captured by the at least one external security camera. In at least one of a periodic basis or based on detecting an event associated with the at least one external camera. In at least one embodiment, an event detected for the at least one external camera may include detecting that the at least one external camera is not operational and/or has lost connectivity to the camera server.

In at least one embodiment, the method may further include determining that the at least one external security camera is not operational; and providing a status update to the vehicle in which the camera status indication identifies the operational status of the at least one external security camera as not operating or has lost connectivity with the camera server. In at least one embodiment, the method may further include obtaining another security mode indication from the vehicle indicating that the onboard security monitoring mode for the vehicle is changed based on the camera status indication.

Referring to FIG. 4, FIG. 4 is a flow chart depicting a method 400, according to an example embodiment. In at least one embodiment, method 400 illustrates operations that may be performed at least in part by a connected vehicle, such as vehicle 102 of FIG. 1A, to perform/determine onboard security monitoring based on context-awareness regarding the availability of one or more external security cameras that may be available for surveillance/security in the vicinity of a parked location of the vehicle 102, according to an example embodiment.

At 402, the method may include providing, by the vehicle to a vehicle server, a location indication identifying a parked location of the vehicle. In at least one embodiment, the location indication may include one or more images captured by one or more onboard cameras of the vehicle at the parked location.

At 404, the method may include obtaining, from the vehicle server, an indication that identifies an availability of at least one external security camera that is capable of monitoring the vehicle at the parked location. In at least one embodiment, the indication obtained by the vehicle may include one or more images captured by the at least one external security camera.

At 406, the method may include selecting, by the vehicle and based, at least in part, on the indication obtained from the vehicle server, an onboard security monitoring mode for the vehicle that is selected from a plurality of monitoring modes for the vehicle including: a first onboard security monitoring mode in which all onboard security monitoring cameras, sensors, and alarms for the vehicle are enabled; a second onboard security monitoring mode in which only a portion of the onboard security monitoring cameras, sensors, and/or alarms for the vehicle are enabled; and a third onboard security monitoring mode in which all of the onboard security monitoring cameras, sensors, and alarms for the vehicle are disabled.

In at least one embodiment, the camera indication obtained from the vehicle server may include a recommended onboard security monitoring mode that the vehicle server recommends for selection by the vehicle.

In at least one embodiment, the selecting at 408 may include analyzing external security camera information and optionally image information obtained from the vehicle server, potentially in combination with user/driver preference(s), in order to select an onboard security monitoring mode for the vehicle. In at least on embodiment, the vehicle may consider a recommended onboard security monitoring mode as indicated by the vehicle server to perform the onboard security monitoring mode selection.

In at least one embodiment, based, at least in part, on receiving image(s) obtained from the at least one external security camera and included in the indication obtained from the vehicle server (e.g., a security monitoring notification, as discussed at least for 222 of FIG. 2B), the vehicle, via logic configured for vehicle, the selecting of the onboard security monitoring mode can include performing image processing operations to correlate images obtained from onboard cameras of the vehicle with image(s) obtained from the vehicle server to perform an image-based determination for determining/confirming whether the at least one external security camera is capable of viewing the vehicle, potentially considering angular and spatial mobility capabilities (e.g., remote control, tilt, pan/rotation, zoom, etc.), low light capabilities, and/or any other capabilities of the at least one external security camera. In some embodiments, the image processing analysis/operations can correlate maximum visibility of the onboard cameras of the vehicle to the potential visibility/viewing area of the at least one external security camera. Thus, the vehicle can determine whether image(s) that can be captured/provided by the at least one external security camera can be leveraged to provide security monitoring for the vehicle at the parked location instead of one or more of the onboard cameras of the vehicle in order to select a corresponding onboard security monitoring mode for the vehicle at the parked location in accordance with various embodiments herein.

At 408, the method may include providing a security mode indication to the vehicle server indicating the onboard security monitoring mode selected by the vehicle. In at least one embodiment, based on the selected onboard security monitoring mode being one of the second onboard security monitoring mode in which only a portion of the onboard security monitoring cameras, sensors, and/or alarms for the vehicle are enabled or the third onboard security monitoring mode in which all of the onboard security monitoring cameras, sensors, and alarms for the vehicle are disabled, the security mode indication may include an ID of one or more external security cameras that the vehicle has selected to provide monitoring for the vehicle at the parked location.

At 410, based on the selected onboard security monitoring mode being one of the second onboard security monitoring mode in which only a portion of the onboard security monitoring cameras, sensors, and/or alarms for the vehicle are enabled or the third onboard security monitoring mode in which all of the onboard security monitoring cameras, sensors, and alarms for the vehicle are disabled, the method may include obtaining at least one status update from the vehicle server that includes a camera status indication that includes at least one of: an operational status of the at least one external security camera; or one or more images captured by the at least one external security camera.

Although not shown in FIG. 4, the vehicle can utilize the camera status indication to determine/detect the occurrence of potential security events (e.g., break-ins, tampering, etc.) involving the vehicle. In various embodiments, the determination/detection can be based on image processing analysis of one or more images obtained from the vehicle server, which can include, but not be limited to enhanced AI/ML image processing analysis to detect/determine the potential occurrence one or more security events involving the vehicle.

Further, in some embodiments, when the vehicle is in an intermediate onboard security monitoring mode or a disabled onboard security monitoring mode, the vehicle is to change to a full onboard security monitoring mode based on one or more of the onboard security monitoring sensors and alarm being triggered.

Figure 5:
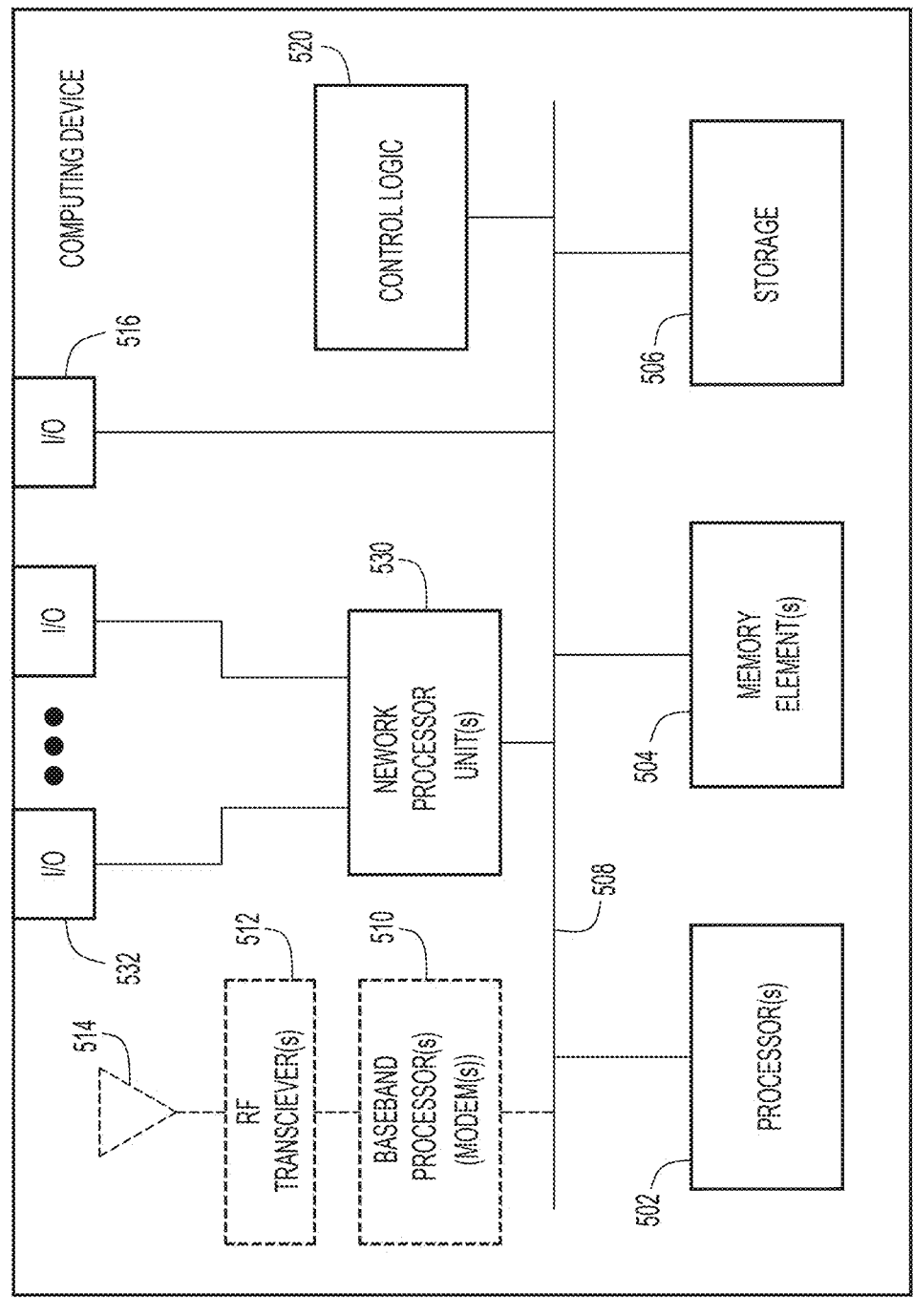
FIG. 5 illustrates a hardware block diagram of a computing device configured to perform functions associated with operations discussed in connection with embodiments herein.

Referring to FIG. 5, FIG. 5 illustrates a hardware block diagram of a computing device 500 that may perform functions associated with operations discussed herein in connection with the techniques described for embodiments herein. In various embodiments, a computing device or apparatus, such as computing device 500 or any combination of computing devices 500, may be configured as any entity/entities in order to perform operations of the various techniques discussed for embodiments herein as discussed with reference to FIGS. 1-4, such as any elements, functions, etc. discussed for embodiments herein (e.g., vehicle 102, vehicle server 110, camera server 120, etc.).

In at least one embodiment, the computing device 500 may be any apparatus that may include one or more processor(s) 502, one or more memory element(s) 504, storage 506, a bus 508, one or more network processor unit(s) 530 interconnected with one or more network input/output (I/O) interface(s) 532, one or more I/O interface(s) 516, and control logic 520. In various embodiments, instructions associated with logic for computing device 500 can overlap in any manner and are not limited to the specific allocation of instructions and/or operations described herein.

For embodiments in which computing device 500 may be implemented as any device capable of wireless communications, such as wireless wide area network and/or wireless local area network communications, computing device 500 may further include at least one baseband processor or modem 510, one or more radio RF transceiver(s) 512 (e.g., any combination of RF receiver(s) and RF transmitter(s)), one or more antenna(s) or antenna array(s) 514.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element (s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa) or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 530 may enable communication between computing device 500 and other systems, entities, etc., via network I/O interface(s) 532 (wired and/or wireless) to facilitate operations discussed for various embodiments described herein. In various embodiments, network processor unit(s) 530 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 532 can be configured as one or more Ethernet port(s), Fibre Channel ports, any other I/O port(s), and/or antenna(s)/ antenna array(s) now known or hereafter developed. Thus, the network processor unit(s) 530 and/or network I/O interface(s) 532 may include suitable interfaces for receiving, transmitting, and/or otherwise communicating data and/or information (wired and/or wirelessly) in a network environment.

I/O interface(s) 516 allow for input and output of data and/or information with other entities that may be connected to computing device 500. For example, I/O interface(s) 516 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 500 is implemented as a wireless device or any apparatus capable of wireless communications, the RF transceiver(s) 512 may perform RF transmission and RF reception of wireless signals via antenna(s)/antenna array(s) 514, and the baseband processor or modem 510 performs baseband modulation and demodulation, etc. associated with such signals to enable wireless communications for computing device 500.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, by a vehicle server, a location indication including a parked location of a vehicle; identifying, by the vehicle server, at least one external security camera at the parked location of the vehicle that is available to monitor the vehicle; providing, by the vehicle server, a camera indication to the vehicle that identifies an availability of the at least one external security camera that is capable of monitoring the vehicle at the parked location; and obtaining, by the vehicle server, a security mode indication from the vehicle indicating an onboard security monitoring mode for the vehicle based, at least in part, on the camera indication.

The onboard security monitoring mode for the vehicle can be selected from a plurality of onboard security monitoring modes for the vehicle, including: a first (full) onboard security monitoring mode in which all onboard security monitoring cameras, sensors, and alarms for the vehicle are enabled; a second (intermediate) onboard security monitoring mode in which only a portion of the onboard security monitoring cameras, sensors, and/or alarms for the vehicle are enabled; and a third (disabled) onboard security monitoring mode in which all of the onboard security monitoring cameras and subset(s) of sensors and alarms associated with visual/security triggers for the vehicle are disabled.

In at least one instance, the method may further include upon determining, based on the security mode indication, that the onboard security monitoring mode for the vehicle is associated with a mode in which only a portion of onboard security monitoring devices of the vehicle are enabled or in which all of the onboard security monitoring devices of the vehicle are disabled, providing at least one status update to the vehicle that includes a camera status indication that includes at least one of: an operational status of the at least one external security camera; or one or more images captured by the at least one external security camera.

In at least one instance, a plurality of status updates are provided to the vehicle on at least one of a periodic basis or based on detecting an event associated with the at least one external security camera. In one at least one instance, the method may further include determining that the at least one external security camera is not operational; and providing a status update to the vehicle in which the camera status indication identifies the operational status of the at least one external security camera as not operating. In at least one instance, the method may further include obtaining another security mode indication from the vehicle indicating that the onboard security monitoring mode for the vehicle is changed based on the camera status indication.

In at least one instance, the identifying, by the vehicle server, the at least one external security camera at the parked location of the vehicle that is available to monitor the vehicle includes: sending a camera query to a camera server including the parked location of the vehicle, wherein the camera server manages a plurality of external security cameras for a plurality of parking locations; and obtaining a camera response from the camera server that identifies the availability of the at least one external security camera that is capable of monitoring the vehicle at the parked location.

In at least one instance, the camera response includes capability information for the at least one external security camera. In at least one instance, the capability information identifies at least one of: a low light or night vision capability of the at least one external security camera; a remote control capability of the at least one external security camera; a tilt capability of the at least one external security camera; a pan capability of the at least one external security camera; or a zoom capability of the at least one external security camera.

In at least one instance, the capability information for the at least one external security camera is included in the camera indication provided to the vehicle. In at least one instance, the location indication obtained from the vehicle further includes one or more images obtained by one or more onboard cameras of the vehicle. In at least one instance, when the vehicle is in an intermediate onboard security monitoring mode or a disabled onboard security monitoring mode, the vehicle is to change to a full onboard security monitoring mode based on one or more onboard security monitoring sensors and/or alarms for the vehicle being triggered.

Accordingly, a unique API driven solution is provided in accordance with embodiments herein. For instances in which a vehicle parked in the vicinity of one or more connected cameras a vehicle server (e.g., vehicle server 110) can proactively determine whether the vehicle is within visibility range of the camera(s) and trigger a request to the vehicle to alert the vehicle regarding the availability of external camera(s) that can provide surveillance and, in some instances, can notify/recommend to the vehicle to enter into on a reduced/light/intermediate sentry/onboard security monitoring mode with minimal camera or to completely disarm the sentry/onboard security mode and use a sensor based approach to trigger sentry/security monitoring mode. The vehicle server can also notify the vehicle if one or more cameras are working or not and when to take over the sentry/onboard security monitoring mode in case of a camera failure.

Thus, the vehicle server as provided by embodiments herein sits between connected vehicles and external security cameras installed at parking structures and thus is in a unique position to facilitate offloading surveillance capabilities from a vehicle's cameras to the external security cameras. APIs that can be configured for the vehicle server may drive/enable synergies with other connected services.

With embodiments as provided herein, the vehicle server can offer differentiated services together with different provide ecosystem in order to provide innovative services such as differentiated onboard security monitoring modes, which can help to reduce battery consumption of vehicles while also providing vehicle security services. With advancements in security surveillance cameras with advanced AI including marking territories for intrusion detection at a given space, security alerts can be defined and linked to access footage that can be sent to/obtained by the vehicle server and communicated to vehicles using different APIs, applications, etc. Thus, embodiments herein may support innovative use cases that may focus on sustainability while providing security using hybrid approaches.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, compo-nents, engines, logic, steps, operations, functions, charac-teristics, etc.) included in 'one embodiment', 'example embodiment', 'an embodiment', 'another embodiment', 'certain embodiments', 'some embodiments', 'various embodiments', 'other embodiments', 'alternative embodi-ment', and the like are intended to mean that any such features are included in one or more embodiments of the present disclosure, but may or may not necessarily be combined in the same embodiments. Note also that a mod-ule, engine, client, controller, function, service, logic or the like as used herein in this Specification, can be inclusive of an executable file comprising instructions that can be under-stood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distin-guish the particular nouns they modify (e.g., element, con-dition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modi-fications as falling within the scope of the appended claims.

What is claimed is:

1. A method comprising:
   obtaining a location indication including a parked location of a vehicle;
   identifying at least one external security camera at the parked location of the vehicle that is available to monitor the vehicle;
   providing a camera indication to the vehicle that identifies an availability of the at least one external security camera that is capable of monitoring the vehicle at the parked location; and
   obtaining a security mode indication from the vehicle indicating an onboard security monitoring mode involving onboard security monitoring devices for the vehicle based, at least in part, on the camera indication, wherein the onboard security monitoring devices for the vehicle include one or both of onboard security monitoring cameras and sensors for the vehicle.

2. The method of claim 1, wherein the onboard security monitoring devices for the vehicle further include alarms for the vehicle, and wherein the onboard security monitoring mode for the vehicle is selected from a plurality of onboard security monitoring modes for the vehicle, including:
   a first onboard security monitoring mode in which all of the onboard security monitoring cameras, sensors, and alarms for the vehicle are enabled;
   a second onboard security monitoring mode in which only a portion of the onboard security monitoring cameras, sensors, and/or alarms for the vehicle are enabled; and
   a third onboard security monitoring mode in which all of the onboard security monitoring cameras, sensors, and alarms for the vehicle are disabled.

3. The method of claim 1, further comprising:
   upon determining, based on the security mode indication, that the onboard security monitoring mode for the vehicle is associated with a mode in which only a portion of onboard security monitoring devices of the vehicle are enabled or in which all of the onboard security monitoring devices of the vehicle are disabled, providing at least one status update to the vehicle that includes a camera status indication that includes at least one of:
      an operational status of the at least one external security camera; or
      one or more images captured by the at least one external security camera.

4. The method of claim 3, wherein a plurality of status updates are provided to the vehicle on at least one of a periodic basis or based on detecting an event associated with the at least one external security camera.

5. The method of claim 3, further comprising:
   determining that the at least one external security camera is not operational; and providing a status update to the vehicle in which the camera status indication identifies the operational status of the at least one external security camera as not operating.

6. The method of claim 5, further comprising:

obtaining another security mode indication from the vehicle indicating that the onboard security monitoring mode for the vehicle is changed based on the camera status indication.

7. The method of claim 1, wherein identifying the at least one external security camera at the parked location of the vehicle that is available to monitor the vehicle includes:

sending a camera query to a camera server including the parked location of the vehicle, wherein the camera server manages a plurality of external security cameras for a plurality of parking locations; and obtaining a camera response from the camera server that identifies the availability of the at least one external security camera that is capable of monitoring the vehicle at the parked location.

8. The method of claim 7, wherein the camera response includes capability information for the at least one external security camera.

9. The method of claim 8, wherein the capability information identifies at least one of:

a low light or night vision capability of the at least one external security camera;

a remote control capability of the at least one external security camera;

a tilt capability of the at least one external security camera;

a pan capability of the at least one external security camera; or a zoom capability of the at least one external security camera.

10. The method of claim 8, wherein the capability information for the at least one external security camera is included in the camera indication provided to the vehicle.

11. The method of claim 1, wherein the location indication obtained from the vehicle further includes one or more images obtained by one or more onboard cameras of the vehicle.

12. The method of claim 1, wherein when the vehicle is in an intermediate onboard security monitoring mode or a disabled onboard security monitoring mode, the vehicle is to change to a full onboard security monitoring mode based on one or more onboard security monitoring sensors and/or alarms for the vehicle being triggered.

13. One or more non-transitory computer readable storage media encoded with instructions that, when executed by a processor, cause the processor to perform operations, comprising:

obtaining a location indication including a parked location of a vehicle;

identifying at least one external security camera at the parked location of the vehicle that is available to monitor the vehicle;

providing a camera indication to the vehicle that identifies an availability of the at least one external security camera that is capable of monitoring the vehicle at the parked location; and obtaining a security mode indication from the vehicle indicating an onboard security monitoring mode involving onboard security monitoring devices for the vehicle based, at least in part, on the camera indication, wherein the onboard security monitoring devices for the vehicle include one or both of onboard security monitoring cameras and sensors for the vehicle.

14. The media of claim 13, wherein the onboard security monitoring devices for the vehicle further include alarms for the vehicle, and wherein the onboard security monitoring mode for the vehicle is selected from a plurality of onboard security monitoring modes for the vehicle, including:

a first onboard security monitoring mode in which all of the onboard security monitoring cameras, sensors, and alarms for the vehicle are enabled;

a second onboard security monitoring mode in which only a portion of the onboard security monitoring cameras, sensors, and/or alarms for the vehicle are enabled; and a third onboard security monitoring mode in which all of the onboard security monitoring cameras, sensors, and alarms for the vehicle are disabled.

15. The media of claim 13, wherein the instructions, when executed by the processor, cause the processor to perform further operations, comprising:

upon determining, based on the security mode indication, that the onboard security monitoring mode for the vehicle is associated with a mode in which only a portion of the onboard security monitoring devices of the vehicle are enabled or in which all of the onboard security monitoring devices of the vehicle are disabled, providing at least one status update to the vehicle that includes a camera status indication that includes at least one of:

an operational status of the at least one external security camera; or one or more images captured by the at least one external security camera.

16. An apparatus, comprising:

at least one memory element for storing data; and at least one processor for executing instructions associated with the data, wherein executing the instructions causes the apparatus to perform operations, comprising:

obtaining a location indication including a parked location of a vehicle;

identifying at least one external security camera at the parked location of the vehicle that is available to monitor the vehicle;

providing a camera indication to the vehicle that identifies an availability of the at least one external security camera that is capable of monitoring the vehicle at the parked location; and obtaining a security mode indication from the vehicle indicating an onboard security monitoring mode involving onboard security monitoring devices for the vehicle based, at least in part, on the camera indication, wherein the onboard security monitoring devices for the vehicle include one or both of onboard security monitoring cameras and sensors for the vehicle.

17. The apparatus of claim 16, wherein the onboard security monitoring devices for the vehicle further include alarms for the vehicle, and wherein the onboard security monitoring mode for the vehicle is selected from a plurality of onboard security monitoring modes for the vehicle, including:

a first onboard security monitoring mode in which all of the onboard security monitoring cameras, sensors, and alarms for the vehicle are enabled;

a second onboard security monitoring mode in which only a portion of the onboard security monitoring cameras, sensors, and/or alarms for the vehicle are enabled; and a third onboard security monitoring mode in which all of the onboard security monitoring cameras, sensors, and alarms for the vehicle are disabled.

18. The apparatus of claim 16, wherein executing the instructions causes the apparatus to perform further operations, comprising:

upon determining, based on the security mode indication, that the onboard security monitoring mode for the vehicle is associated with a mode in which only a portion of the onboard security monitoring devices of the vehicle are enabled or in which all of the onboard security monitoring devices of the vehicle are disabled, providing at least one status update to the vehicle that includes a camera status indication that includes at least one of:

an operational status of the at least one external security camera; or one or more images captured by the at least one external security camera.

19. The apparatus of claim 18, wherein executing the instructions causes the apparatus to perform further operations, comprising:

determining that the at least one external security camera is not operational; and providing a status update to the vehicle in which the camera status indication identifies the operational status of the at least one external security camera as not operating.

20. The apparatus of claim 16, wherein identifying the at least one external security camera at the parked location of the vehicle that is available to monitor the vehicle includes:

sending a camera query to a camera server including the parked location of the vehicle, wherein the camera server manages a plurality of external security cameras for a plurality of parking locations; and obtaining a camera response from the camera server that identifies the availability of the at least one external security camera that is capable of monitoring the vehicle at the parked location.

\* \* \* \* \*